(12) United States Patent
Ishikawa et al.

(10) Patent No.: US 7,788,978 B2
(45) Date of Patent: *Sep. 7, 2010

(54) SUPPORT MEMBER OF VIBRATOR

(75) Inventors: Seiji Ishikawa, Aichi-Gun (JP); Takayuki Kikuchi, Kamiina-Gun (JP); Shigeki Hayashi, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/259,441

(22) Filed: Oct. 28, 2008

(65) Prior Publication Data

US 2009/0072672 A1    Mar. 19, 2009

Related U.S. Application Data

(63) Continuation of application No. 11/430,531, filed as application No. PCT/JP2004/016361 on Oct. 28, 2004, now Pat. No. 7,456,554.

(30) Foreign Application Priority Data

Nov. 12, 2003    (JP)    ............................. 2003-382739

(51) Int. Cl.
  *G01P 9/04*    (2006.01)
  *H01L 41/00*    (2006.01)
(52) U.S. Cl. .................. 73/504.12; 73/504.16; 310/367
(58) Field of Classification Search .................. 73/493, 73/504.12, 504.16, 504.04, 514.29; 310/351, 310/352, 367, 368, 369
See application file for complete search history.

(56) References Cited

U.S. PATENT DOCUMENTS

| | | | |
|---|---|---|---|
| 5,747,916 A | 5/1998 | Sugimoto et al. | |
| 6,112,594 A * | 9/2000 | Brinks et al. | 73/493 |
| 6,571,442 B1 | 6/2003 | Okeshi et al. | |
| 6,698,292 B2 * | 3/2004 | Kikuchi | 73/662 |
| 7,000,472 B2 * | 2/2006 | Kinoshita | 73/504.12 |
| 7,207,221 B2 * | 4/2007 | Kawauchi et al. | 73/504.12 |
| 7,278,313 B2 * | 10/2007 | Hayashi et al. | 73/504.12 |
| 7,437,932 B2 * | 10/2008 | Kawauchi | 73/504.12 |
| 7,456,554 B2 * | 11/2008 | Ishikawa et al. | 310/367 |
| 2003/0141340 A1 | 7/2003 | Ishikawa et al. | |
| 2003/0177836 A1 | 9/2003 | Kikuchi | |

FOREIGN PATENT DOCUMENTS

| | | |
|---|---|---|
| JP | 06-123633 A1 | 5/1994 |
| JP | 10-206161 A1 | 8/1998 |
| JP | 2001-012955 A1 | 1/2001 |
| JP | 2001-082962 A1 | 3/2001 |
| JP | 2003-294450 A1 | 10/2003 |

* cited by examiner

*Primary Examiner*—Helen C. Kwok
(74) *Attorney, Agent, or Firm*—Burr & Brown

(57) ABSTRACT

The present invention provides, in a physical quantity measuring system using a vibrator, a supporting structure of a vibrator for reducing the zero-point temperature drift of detection signal. It is provided a supporting member for supporting a vibrator with bonding wires. The supporting member has a supporting plate with an opening formed therein to be positioned direct under a vibrator, and a bonding wire comprising a bonding end to be bonded with the vibrator, a fixed portion fixed on the supporting plate and a bent portion direct under the opening. A distance "L1" between the bent portion and a position where the bonding wire starts to protrude from the supporting plate is 10 percent or more of a distance "L2" of the bent portion and the bonding end.

10 Claims, 23 Drawing Sheets

SUPPORT MEMBER OF VIBRATOR

CROSS REFERENCE TO RELATED APPLICATIONS

This application is a continuation of U.S. patent application Ser. No. 11/430,531, filed May 9, 2006, which in turn is a continuation of International Application No. PCT/JP2004/016361, filed Oct. 28, 2004, the entireties of which are incorporated herein by reference.

FIELD OF THE INVENTION

The present invention relates to a member and structure for supporting a vibrator suitable for a vibratory gyroscope.

BACKGROUND OF THE INVENTION

According to a vehicle control system, a vibratory gyroscope and its vibrator is subjected to a wide temperature range including high and low ambient temperatures. Such temperature range normally includes minus 40° C. to plus 85° C. and may be more wider in a more severe specification. Particularly when a vibrator is made of a piezoelectric single crystal, the temperature dependency of the single crystal may affect the stability of the gyroscope. Japanese Patent Publication 2001-012955A, filed by NGK Insulators, Ltd., disclosed a vibratory gyroscope having a specific shape with low noise level. Further, in Japanese Patent Publication No. 2001-82962A, it is disclosed that a vibrator is adhered to a supporting member with an adhesive having a tan δ of not higher than 0.1 within the temperature range for use, for preventing the deviation of Q value of a detection vibration with temperature change. The second patent publication further disclosed a vibrator for a vibratory gyroscope having a specific shape with low noise level.

SUMMARY OF THE INVENTION

When a vibrator is fixed on and supported with a substrate in a package, peak temperature drift may be generated in crystal impedance in a specific temperature range, depending on the state of supporting. Such temperature range where the temperature drift is observed may be variously shifted such as in a range of minus 40 to plus 20° C. in one vibrator and in a range of minus 40 to plus 60° C. in another vibrator, so that the drift is difficult to control. It is necessary to reduce the peak temperature drift and at least to shift the peak drift to the outside of a range of minus 40 to plus 85° C.

An object of the present invention is to provide a structure for supporting a vibrator capable of reducing a zero point temperature drift of a detection signal in a system for measuring a physical quantity using a vibrator.

A first aspect of the present invention provides a member for supporting a vibrator with a bonding wire, said member comprising:

a supporting plate with an opening formed therein to be positioned direct under a vibrator; and a bonding wire comprising a bonding end to be bonded with the vibrator, a fixed portion fixed on the supporting plate and a bent portion. A distance "L1" between the bent portion and a position where the bonding wire starts to protrude from the supporting plate is 10 percent or more of a distance "L2" of the bent portion and the bonding end. The present invention further provides a structure for supporting a vibrator comprising the member and a vibrator supported with the supporting member.

A second aspect of the present invention provides a member for supporting a vibrator with a bonding wire, said member comprising:

a supporting plate with an opening formed therein to be positioned direct under a vibrator; and a bonding wire comprising an end portion to be bonded with the vibrator, a fixed portion fixed on the supporting plate, a leg portion extending from the end portion and a curved portion provided between the leg and fixed portions.

According to the supporting member and supporting structure of the present invention, the zero point temperature drift of detection signal described above can be reduced. The present invention will be described further in detail, referring to the attached drawings.

DETAILED DESCRIPTION OF THE INVENTION

Figure 1:
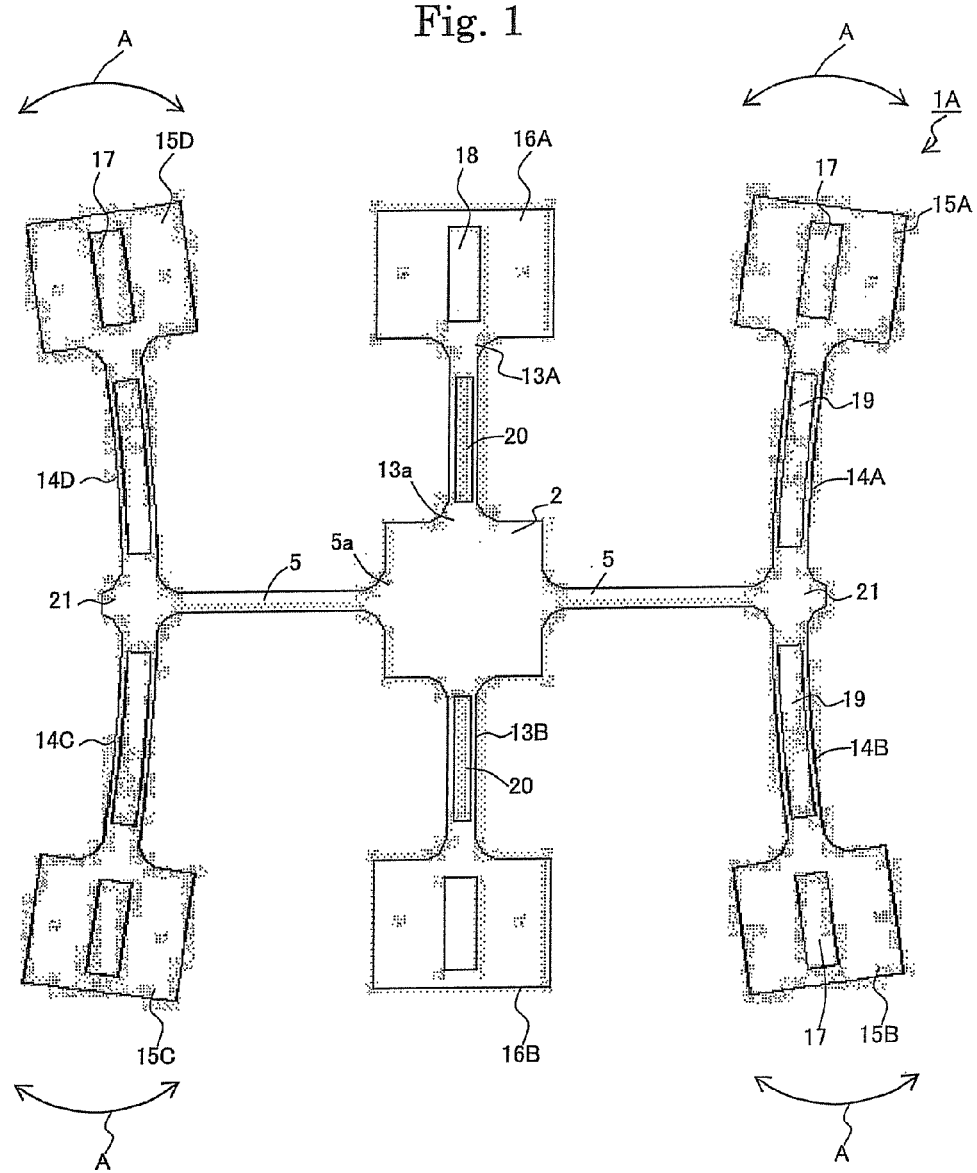
FIG. 1 is a plan view showing an example of a vibrator 1A used in the present invention (driving vibration mode).
Figure 2:
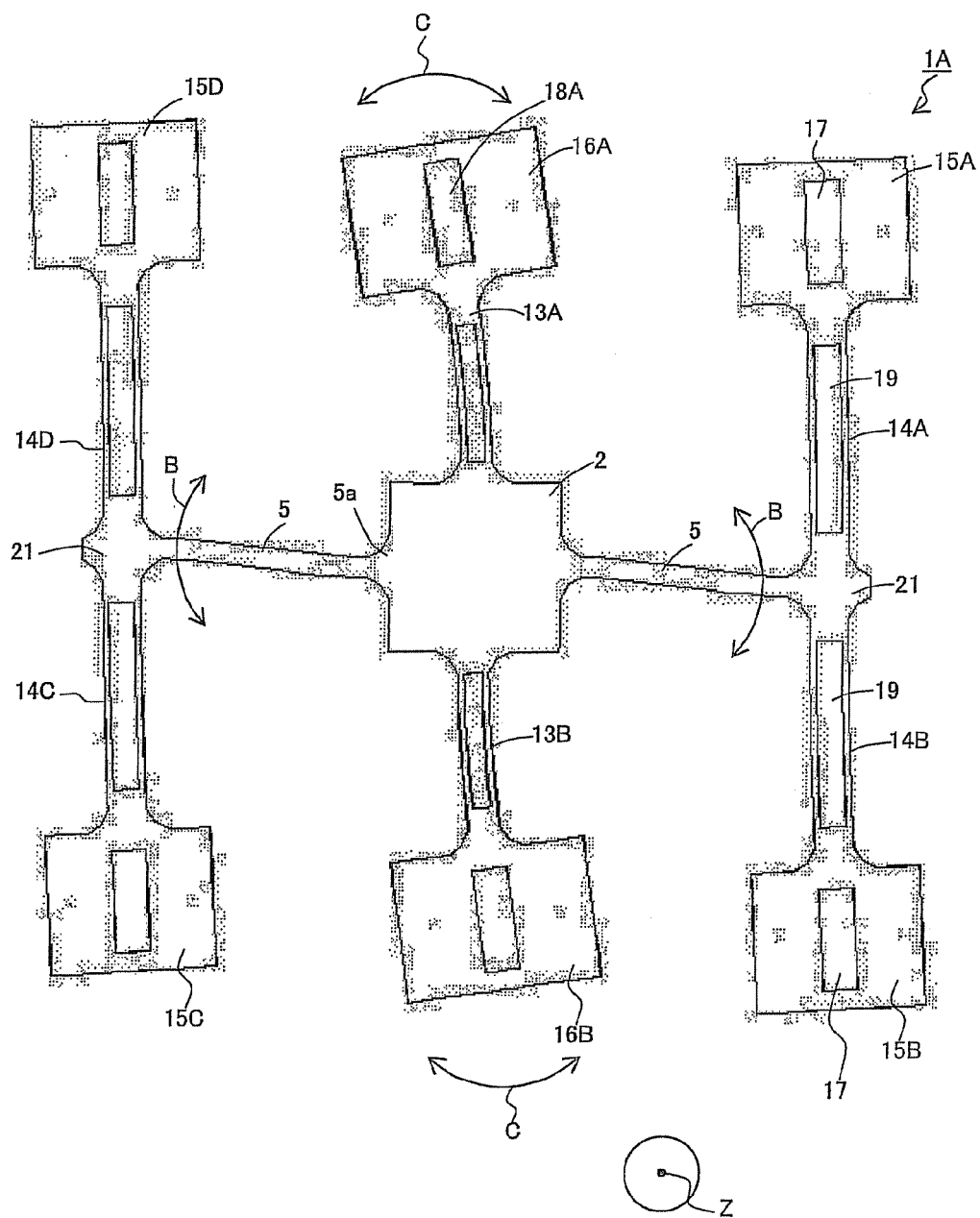
FIG. 2 is a plan view showing an example of a vibrator 1A used for the present invention (detection vibration mode).

FIG. 1 is a plan view schematically showing a vibrator 1A (driving vibration mode) according to one embodiment of the present invention. FIG. 2 is a plan view showing detection vibration mode of the vibrator 1A.

The vibrator 1A according to the present example has a base portion 2, a pair of detection vibration pieces 13A and 13B protruding from the base portion 2, a pair of connecting portions 5 protruding from the base portion 2, and driving vibration pieces 14A, 14B, 14C and 14D provided at the tip ends of the connecting portions 5, respectively.

Elongate grooves are formed on main faces of the driving vibration pieces 14A to 14D, respectively. The cross sectional shape of each of the driving vibration pieces 14A to 14D is substantially of "H" character. A driving electrode 19 is formed in the groove. Wide or weight portions 15A, 15B, 15C and 15D are provided at the tip ends of the driving vibration pieces 14A to 14D, respectively. A through hole 17 is formed in each wide portion. An elongate groove is formed on each main face of each of the detection vibration pieces 13A and 13B, and the cross sectional shape of each of the detection vibration pieces 13a and 13B is substantially of "H" character. A detection electrode 20 is formed in each groove. Wide or weight portions 16A and 16B are provided at the tip ends of the detection vibration pieces 13A and 13B, respectively, and a through hole 18 is formed in each wide portion.

FIG. 1 shows the vibration mode of the driving vibration. When driving vibration is excited, each of the driving vibration pieces 14A to 14D vibrates around the root 21 of the piece to the supporting portion 5 as its fulcrum as an arrow "A". The vibrator 1A is then rotated around a rotating axis Z extending in a direction perpendicular to the vibrator 1A. As shown in FIG. 2, the supporting portion 5 then vibrates in bending vibration mode around the root 5a of the supporting portion 5 to the fixing portion 2 as its fulcrum, as an arrow "B". Responsive to the vibration, each of the detection vibration piece 13A and 13B vibrates in bending vibration mode around the root of the piece to the fixing portion 2 as an arrow "C". Each of the detection vibration pieces 13A and 13B generates electrical signal corresponding to the detection vibration. The electrical signal is then utilized to calculate a turning angular rate around the rotating axis Z.

Figure 3:
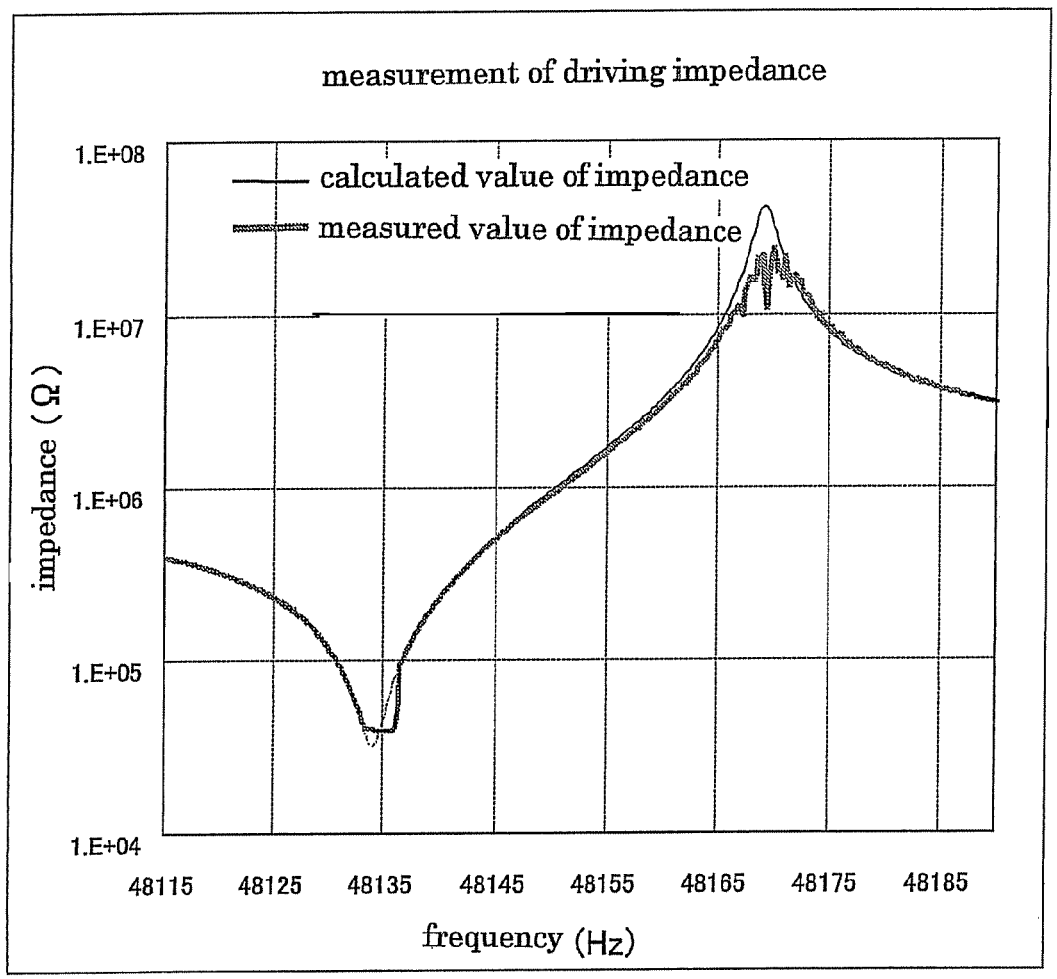
FIG. 3 is a graph showing relationship of crystal impedance, frequency and phase.

The present inventors have tried to support a vibratory gyroscope using a vibrator shown in FIGS. 1 and 2, with wire bondings on a packaging substrate and to perform an experiment of detecting turning angular rate under various conditions. It is thus found that peaks are observed in the crystal impedance in a specific temperature range depending on the state of supporting, even when the same kind of vibrator is used. The process will be described more in detail. As shown in FIG. 3, when the vibrator is measured by means of an impedance analyzer, it is found that the peak of the crystal impedance flattened. According to FIG. 3, the horizontal axis represents frequency, the vertical axis (left side) represents crystal impedance and the vertical axis (right side) represents the phase.

Figure 4:
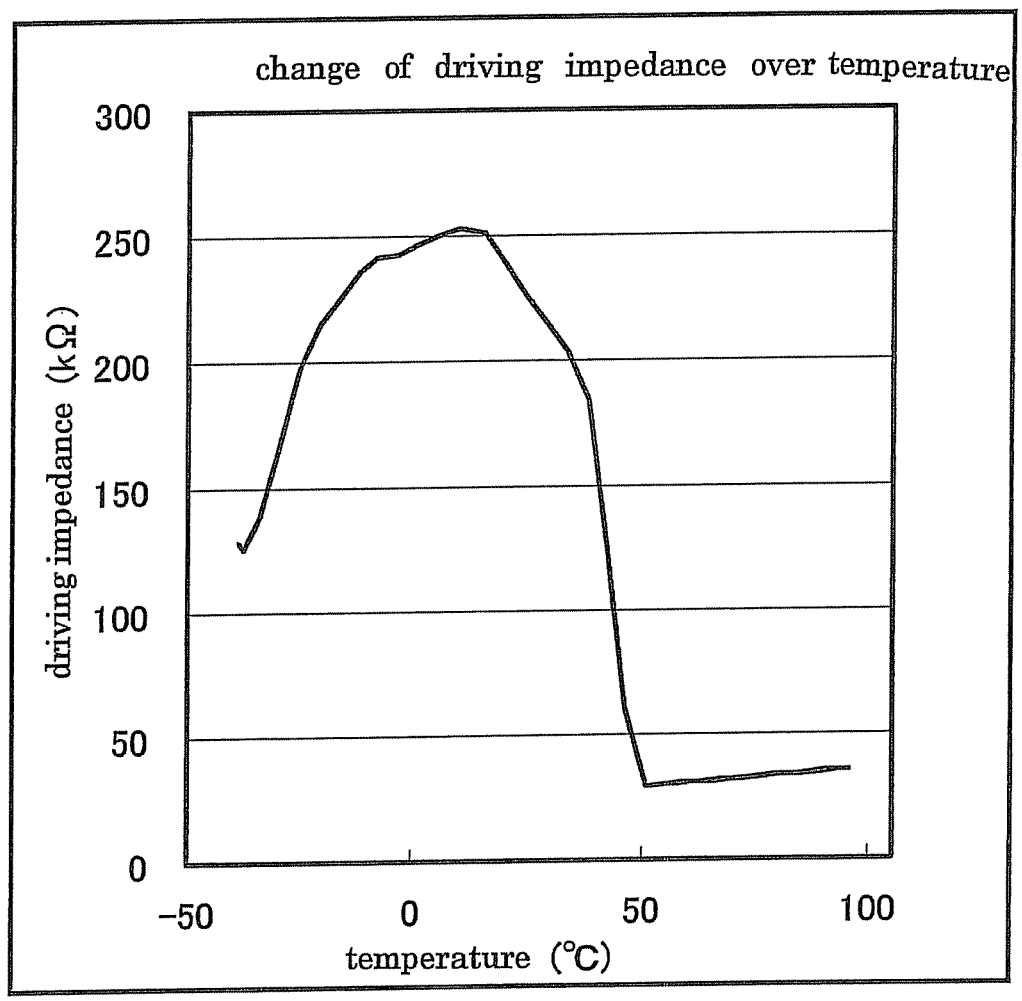
FIG. 4 is a graph showing relationship of driving impedance, temperature and phase of the driving.
Figure 8:
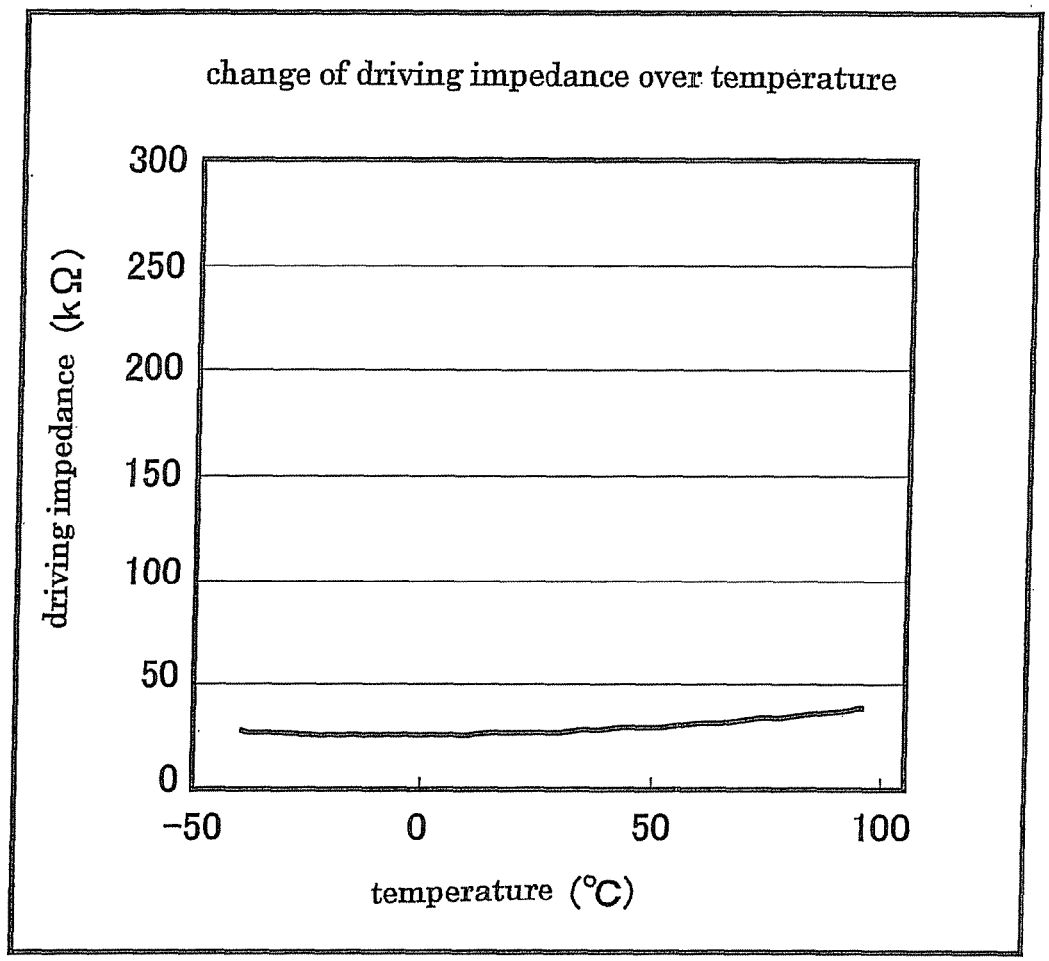
FIG. 8 is a graph showing the temperature change of driving impedance of a vibratory gyroscope capable of functioning normally.

The temperature characteristic of the crystal impedance of the vibrator was then measured. That is, the change of the driving impedance over temperature was measured for a vibratory gyroscope using the vibrator shown in FIG. 3, and the results of the measurement were shown in FIG. 4. In FIG. 4, the horizontal axis represents temperature (from minus 40° C. to plus 85° C.), and the vertical axis represents the driving impedance. The peak can be observed in the graph of the crystal impedance for driving over a temperature range of, for example, plus 50 to minus 40° C. Contrary to this, the driving impedance was proved to be substantially flat over a wide range of temperature, for example as shown in FIG. 8, in a normally operating vibratory gyroscope.

Figure 5:
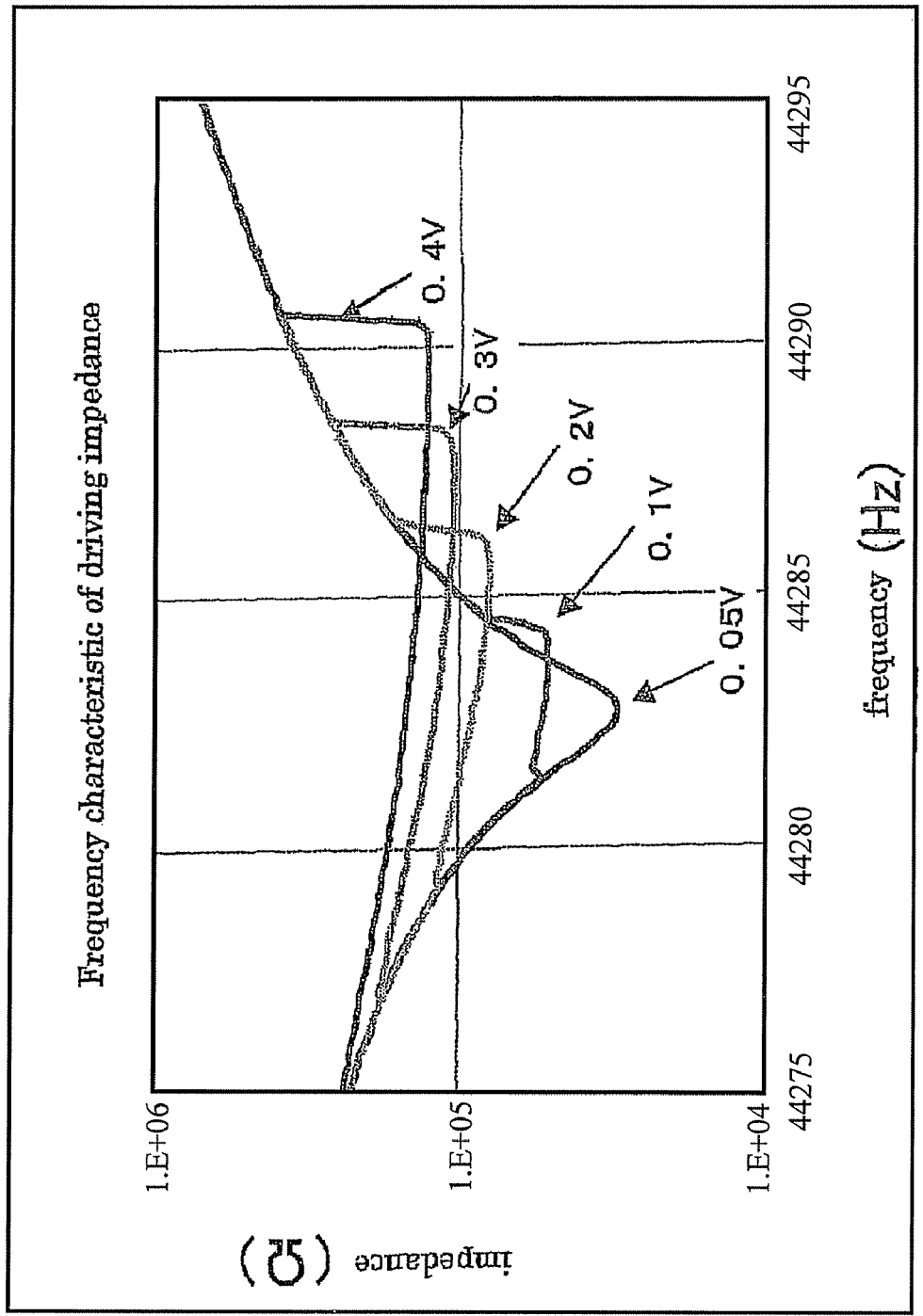
FIG. 5 is a graph showing relationship of frequency and crystal impedance (voltage/current).

Further, the relationship of frequency and crystal impedance (voltage/current) was studied and the results were shown in FIG. 5. The voltage was changed to 0.05, 0.1, 0.2, 0.3, 0.4 and 0.5 volts, respectively. As a result, a normal peak was observed at a voltage of 0.05 volt and the peak was considerably flattened at a voltage of 0.1 volt. When the voltage was 0.2 volts pr higher, the flat region was proved to be very wide, so that "resonance flattening" phenomenon was observed.

Figure 6:
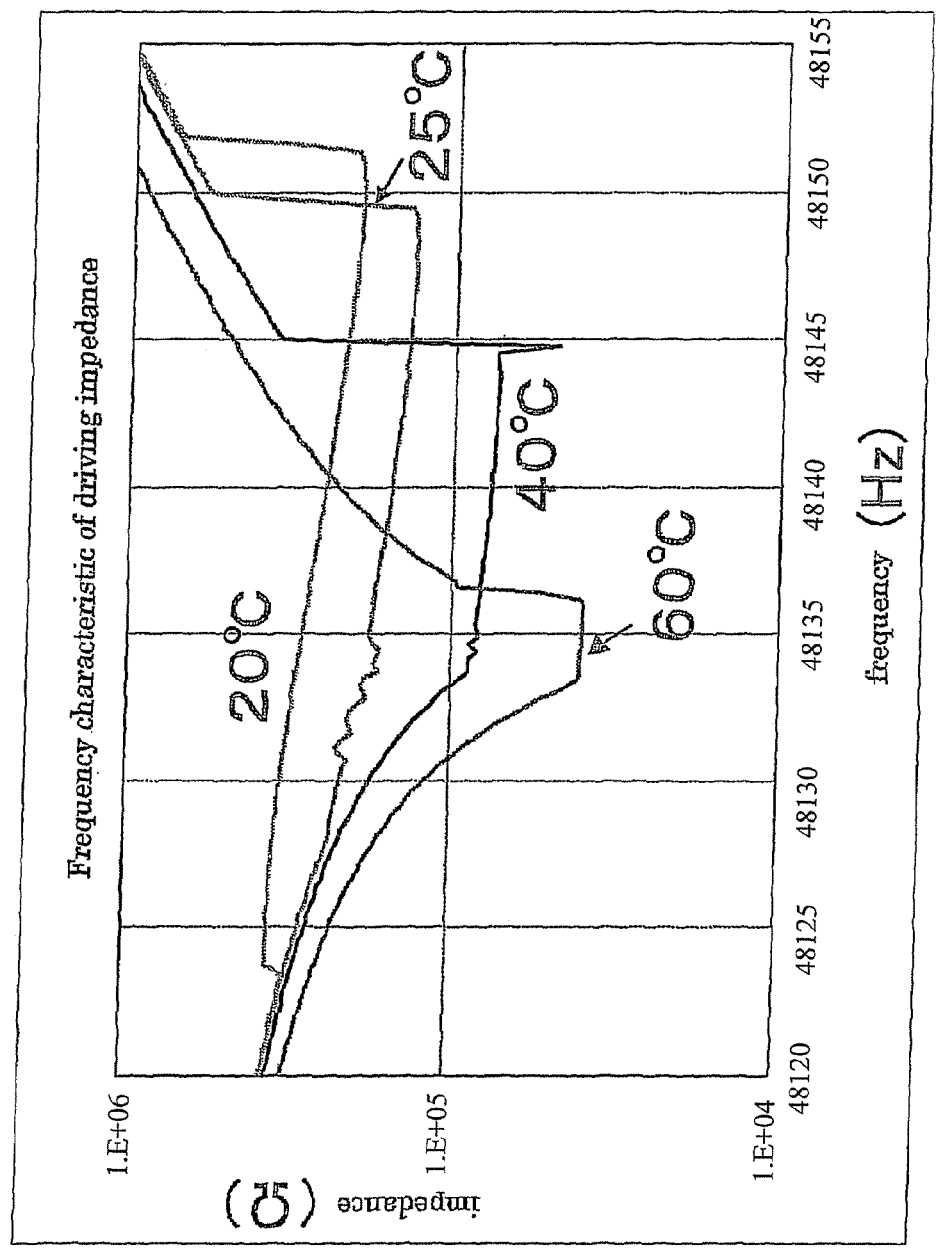
FIG. 6 is a graph showing relationship of crystal impedance and frequency.

The temperature was then changed to 20° C., 25° C., 40° C. or 60° C. and the relationship of the crystal impedance and frequency was measured. The results were shown in FIG. 6. As a result, the resonance flattening phenomenon proved to be changed depending on temperature. Particularly, the height of the crystal impedance proved to be changed depending on temperature when the resonance flattening is observed. This means that the current value when the resonance flattening in observed (flattening current value) is changed depending on temperature.

Figure 7:
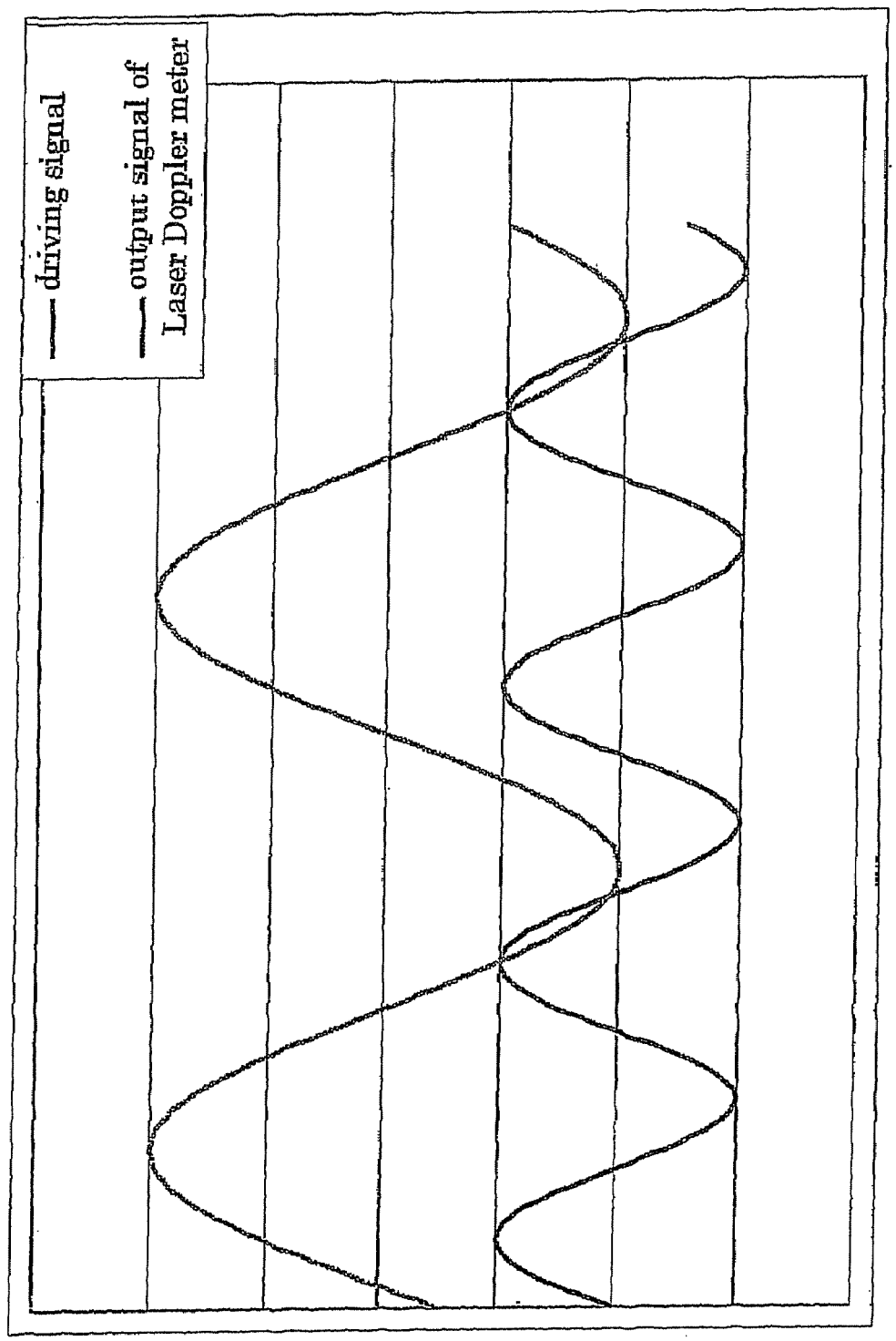
FIG. 7 is a graph showing the results of laser Doppler measurement of a sample where resonance flattening phenomenon (current) is observed.
Figure 9:
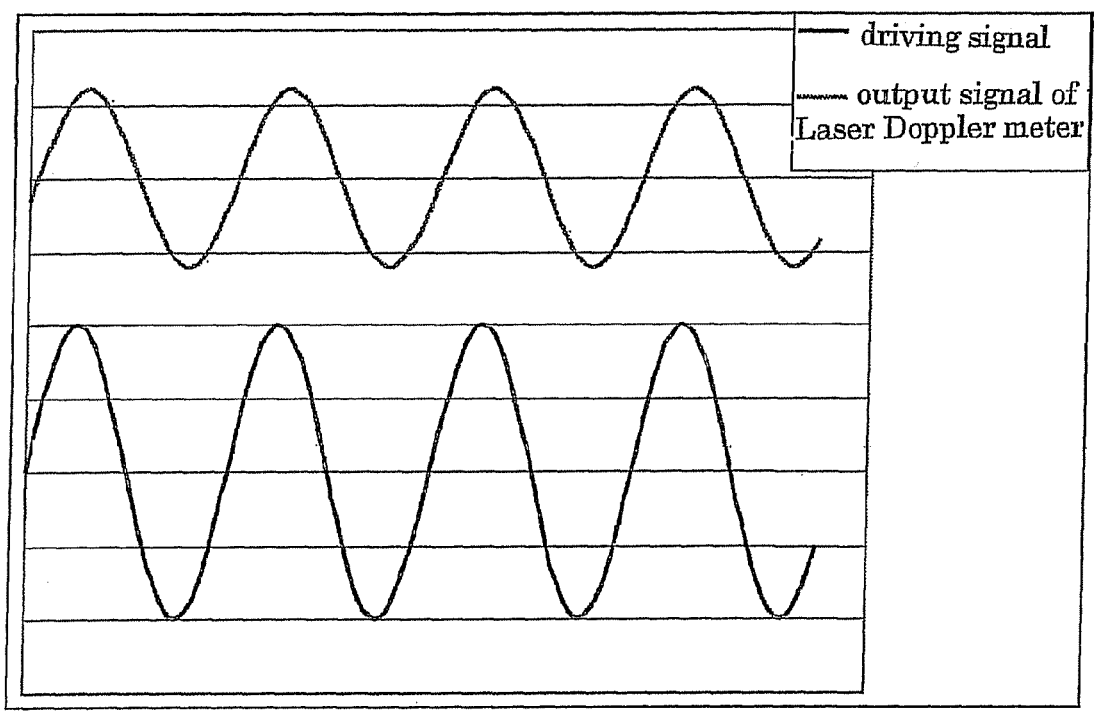
FIG. 9 is a graph showing the results of laser Doppler measurement of a vibratory gyroscope capable of functioning normally.

Laser Doppler measurement was further performed for the above sample which the resonance flattening phenomenon (current) was observed. FIG. 7 shows the results. In FIG. 7, the upper graph shows the Doppler output and the lower graph shows the driving voltage. It is proved that the Doppler output having a frequency of about ½ (fd/2) of the frequency of the driving voltage. On the contrary, in the case of a normally operating vibratory gyroscope, the frequency of the driving signal is the same as that of the output signal from a laser Doppler measuring system. The Doppler output having a frequency of about ½ of that of the driving signal was not observed (refer to FIG. 9).

Figure 10:
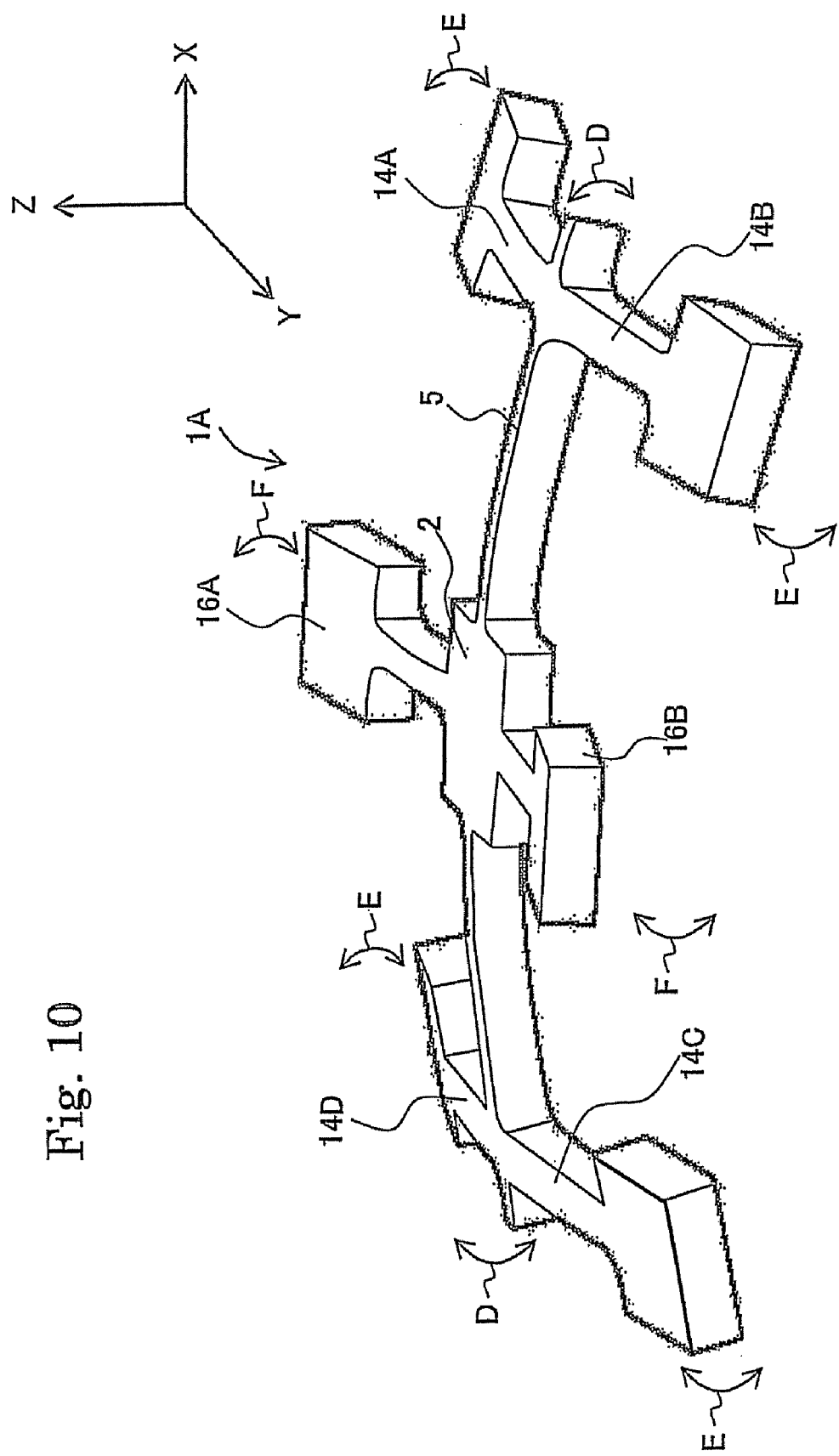
FIG. 10 is a perspective view showing unnecessary vibration modes D, E and F when a vibrator 1A is not supported.

The present inventors have analyzed the vibration mode having a frequency near (fd/2) and obtained the following findings. That is, according to the vibrator (not supported) shown in FIGS. 1 and 2, it is observed the vibration mode shown in a perspective view of FIG. 10 and a plan view of FIG. 11. According to this vibration mode, the elongate connecting portion 5 vibrates in bending mode to the direction of Z-axis (direction of rotating axis) around the root to the base portion 2 as the fulcrum, as an arrow "D". At the same time, each of the driving vibration pieces 14A, 14B, 14C and 14D vibrates in the direction of Z-axis around the tip end of the connecting portion 5 as the fulcrum, as shown in arrows "E". The bending vibration as an arrow "D" and the bending vibration as an arrow "E" are of the same phase with respect to the plane of the vibrator and have the same frequency. At the same time, each of the detection vibration pieces 13A and 13B vibrates in bending mode in the direction of Z-axis around the root 13a to the base portion as the fulcrum, as an arrow "F". The bending vibration mode as an arrow "F" and the bending vibration mode as an arrow "D" or "E" are of the inverse phase with respect to the plane of the vibrator and have the same frequency.

Figure 11:
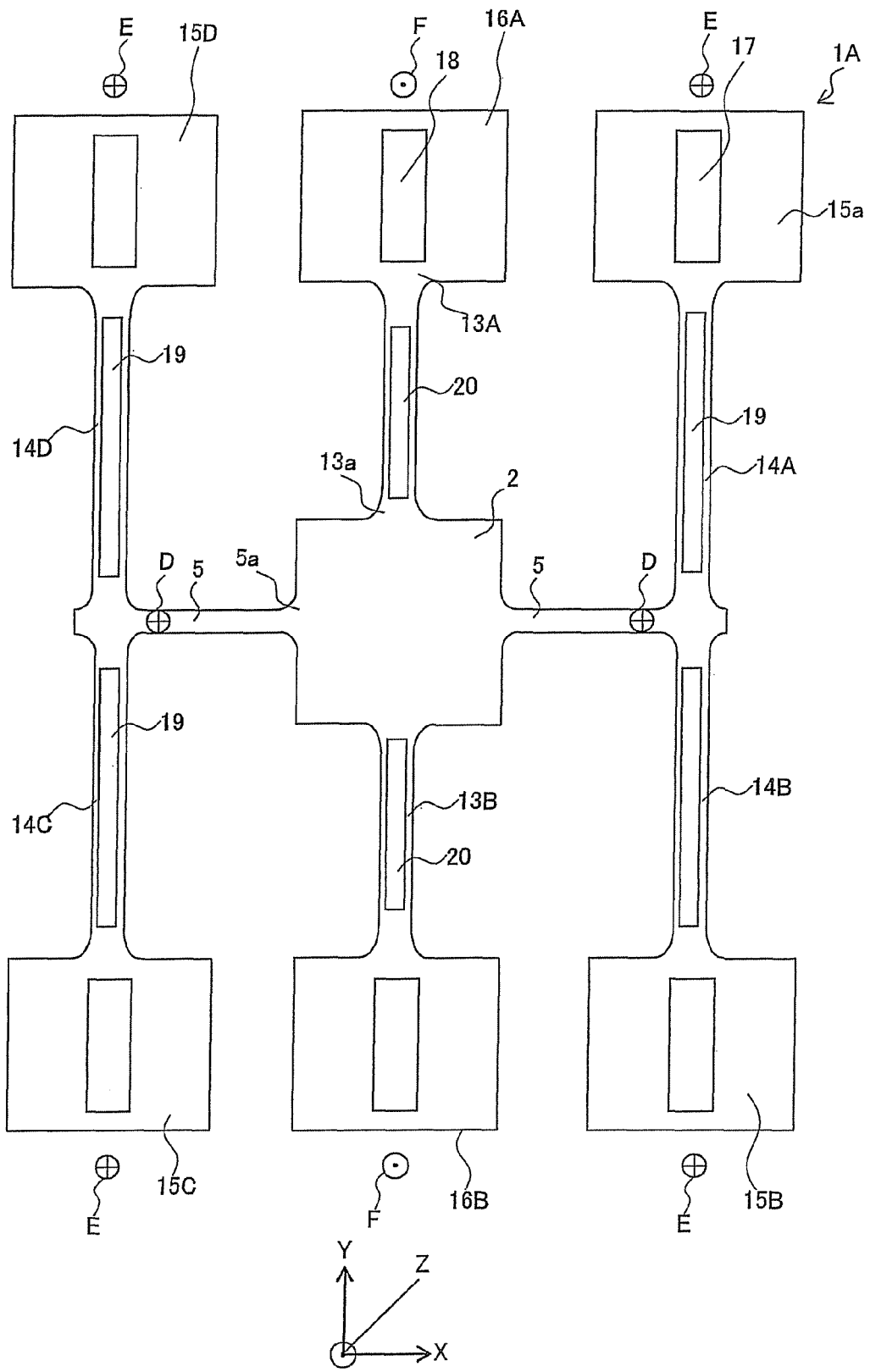
FIG. 11 is a plan view showing vibration modes shown in FIGS. 10 and 12.
Figure 12:
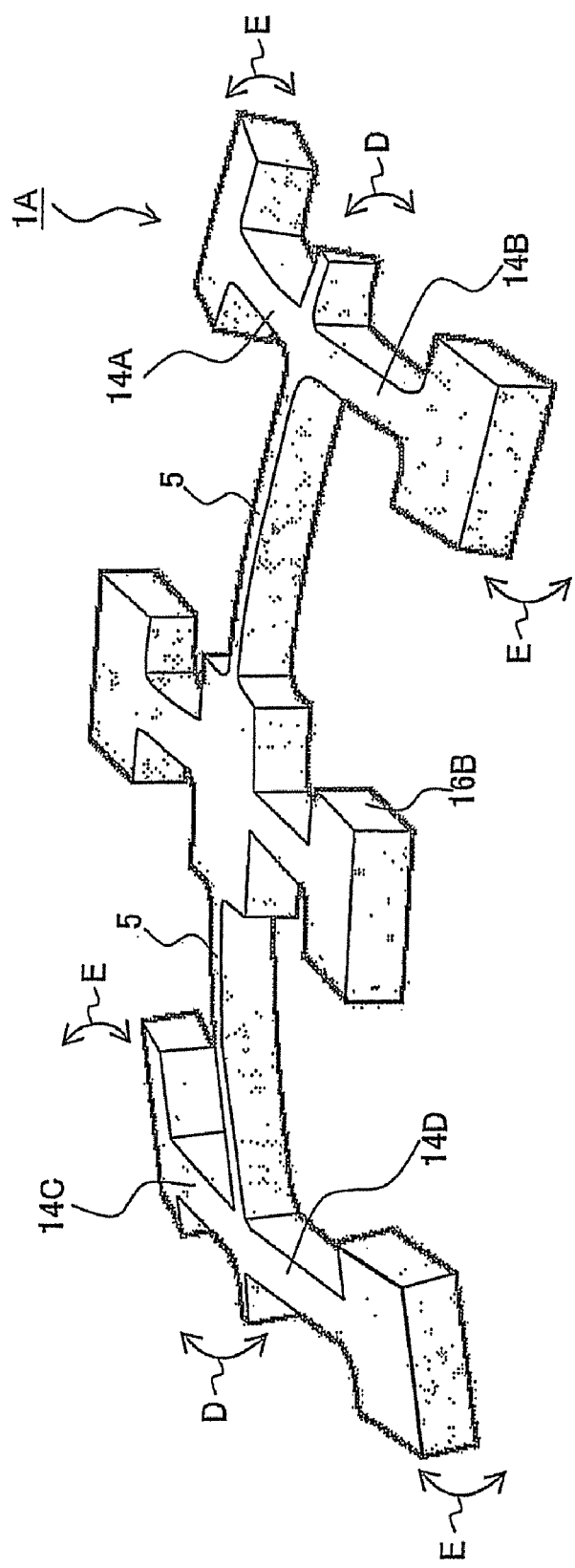
FIG. 12 is a perspective view showing vibration modes D and E when a vibrator 1A is supported.

On the contrary, when the vibrator 1A is supported with wire bondings, the vibration mode shown as arrows "D" and "E" in FIGS. 11 and 12 was observed depending on the state of supporting. The vibration mode is composed of only the vibration mode as arrows "D" and "E" of the driving vibration piece and connecting portion separated from the vibration modes "D", "E" and "F" shown in FIG. 10. Specifically, the elongate connecting portion 5 vibrates in bending mode in the direction of Z-axis (rotation axis) around the root to the base portion 2 as an arrow "D". At the same time, each of the driving vibration pieces 14A, 14B, 14C and 14D vibrates in bending mode in the direction of Z-axis around the tip end of the connecting portion 5 as an arrow "E". The bending vibration mode as the arrow "D" and that as the arrow "E" are of the same phase with respect to the plane of the vibrator and have the same frequency. It is proved that the bending vibration mode of FIG. 12 is observed by supporting the vibrator and has a resonance frequency near fd/2. The state and position of the supporting can be appropriately selected so that the resonance frequency of the vibration mode can be changed and made distant from fd/2 by a specific amount. It is found that the peak-like increase of the crystal impedance in a range of minus 40° C. to plus 85° C. can be prevented.

Figure 13:
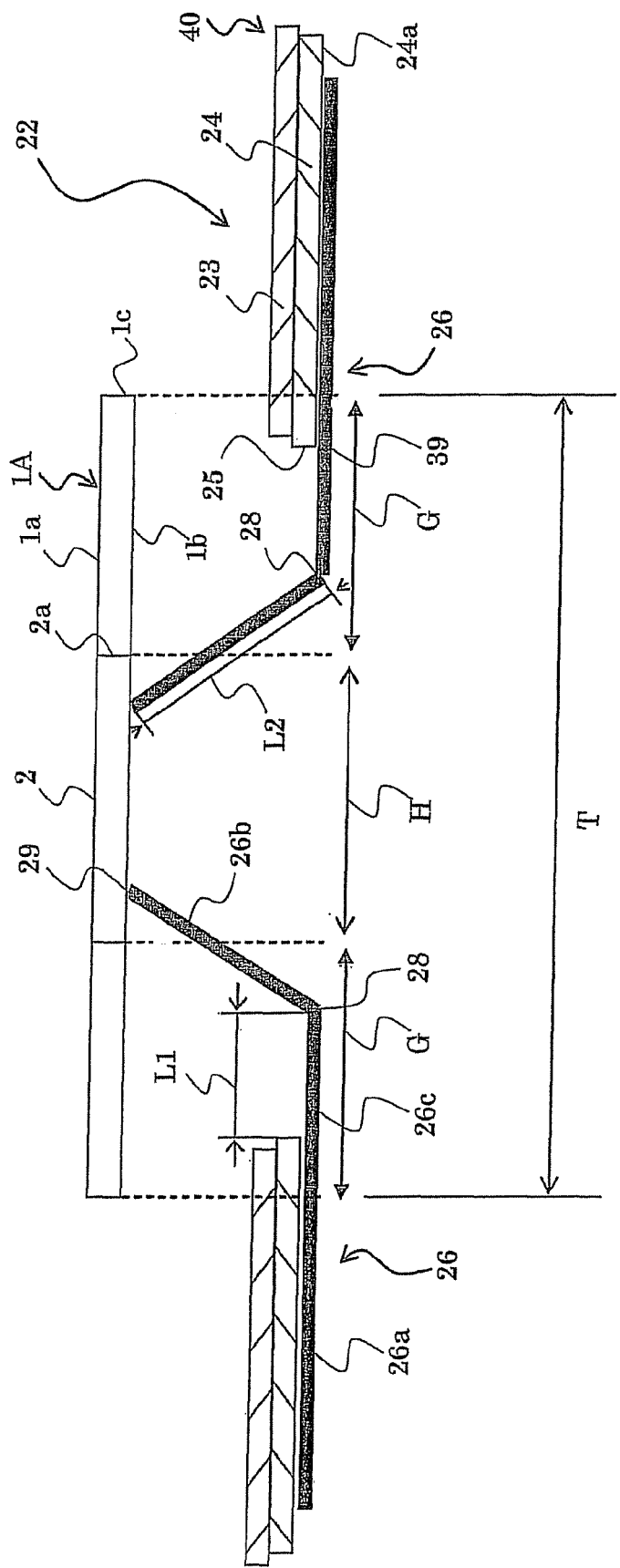
FIG. 13 is a cross sectional view schematically showing an example of a supporting structure for a vibrator 1A.

The supporting structure will be described referring to the drawings. FIG. 13 is a cross sectional view schematically showing a supporting member 22 according to one embodiment of the present invention. According to the present example, a supporting plate 40 is obtained by, for example, laminating a metal plate 23 and an insulating plate 24. An opening 25 is formed in the supporting plate 40 under the vibrator 1A. A fixing portion 26a of a bonding wire 26 is fixed on, for example, the side of a back face 24a of the supporting plate 40. The fixing method is not particularly limited and may be made using a polyimide series adhesive.

The bonding wire 26 has a protrusion 26c into the opening 25, a bent portion 28, an inclined portion 26b passing through the opening 25 and a bonding end 29 to the lower face 1b of the vibrator 1A as well as a fixing portion 26a to the back face 24a of the supporting plate 40. The number and position of the bonding wire 26 may be appropriately changed.

According to the present invention, "L1" is assigned to a distance between a position 39 where the bonding wire 26 is protruded from the supporting plate 40 and the bent portion 28, and "L2" is assigned to a distance between the bent portion 28 and bonding end 29. L1 is made 10 percent or higher of L2. As described above, it is applied a design that the length "L1" of the protruding portion 26c in the opening 25 is made larger to some extent. According to this design, even when the vibration mode having a resonance frequency (fd/2) of half of that of the driving vibration would have been present, the resonance frequency can be made considerably distant from fd/2. It is thereby found that the temperature drift of the output or the crystal impedance can be reduced over a wide temperature range. On the viewpoint, "L1/L2" may preferably be 30 percent or higher and more preferably be 50 percent or more.

Figure 14:
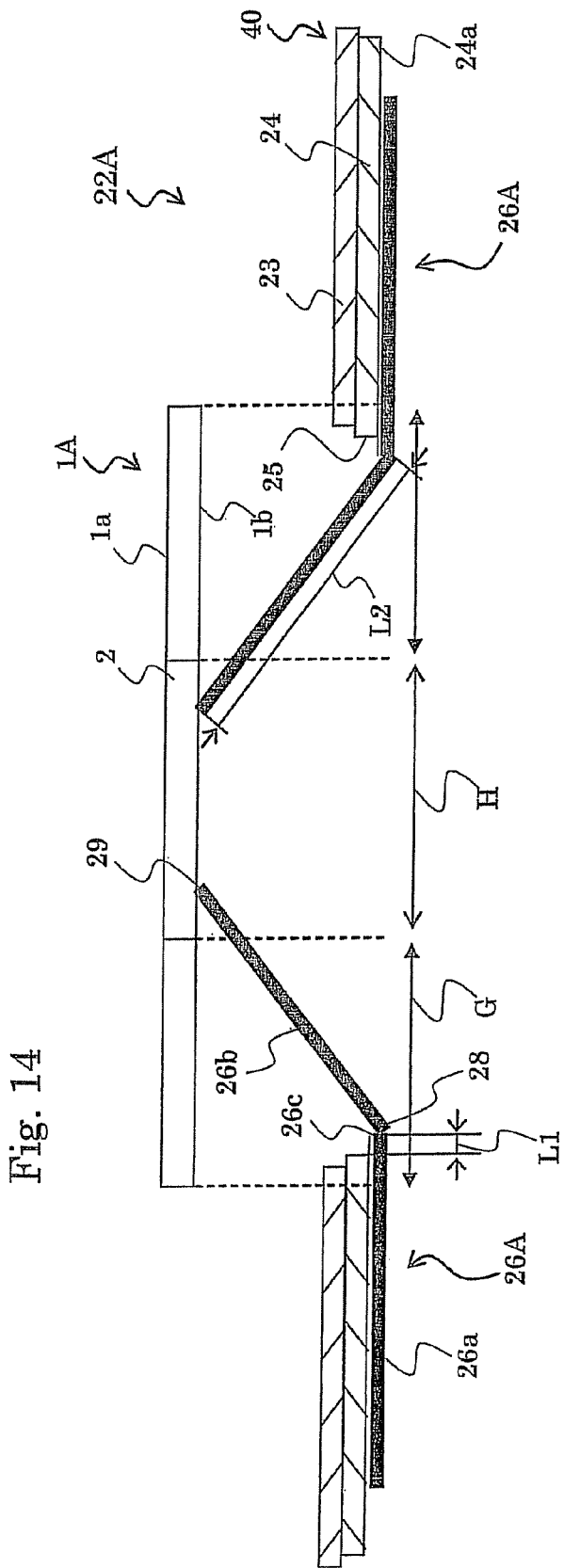
FIG. 14 is a cross sectional view schematically showing a supporting structure according to a comparative example 1.

On the contrary, in the case of a supporting member 22A shown in FIG. 14, "L1" is shorter and L1/L2 is lower than 5 percent, for example, in the bonding wire 26A. According to this supporting structure, the resonance frequency of the vibration mode closest to ½ of the resonance frequency of the driving vibration is shifted to be higher and tends to be closer to fd/2. "L1" is made relatively large so that the frequency of the vibration mode can be lowered and made more distant from fd/2.

When L1 is too large, however, the height of the vibrator 1A with respect to the supporting plate 40 tends to be deviated so that the amplitude of unnecessary vibration would be increased. On the viewpoint, L1/L2 may preferably be 400 percent or lower and more preferably be 300 percent or lower.

Further, According to the second aspect of the present invention, the bonding wire has an end portion to be connected with the vibrator, a fixed portion fixed to the supporting plate, a leg portion extending from the end portion, and a curved portion provided between the leg portion and fixed portions.

Figure 22:
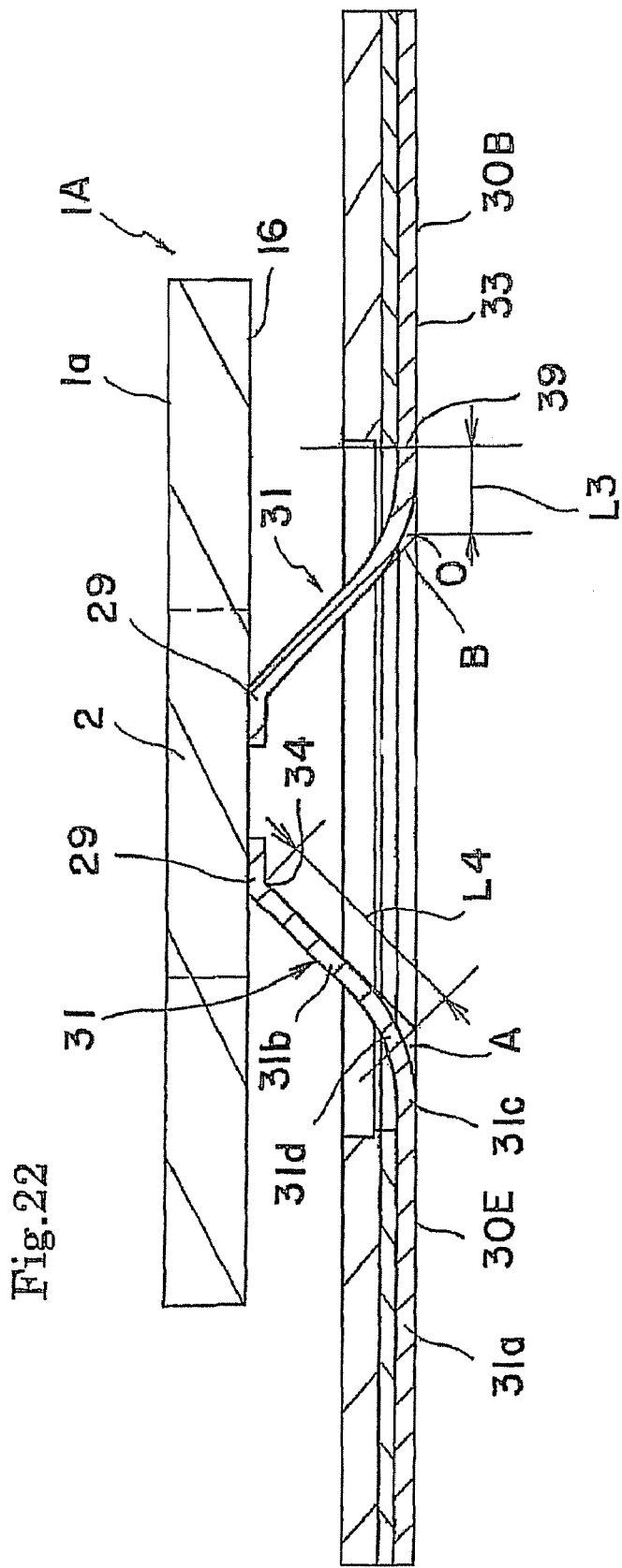
FIG. 22 is a cross sectional view showing a supporting structure according to a second aspect of the present invention.
Figure 23:
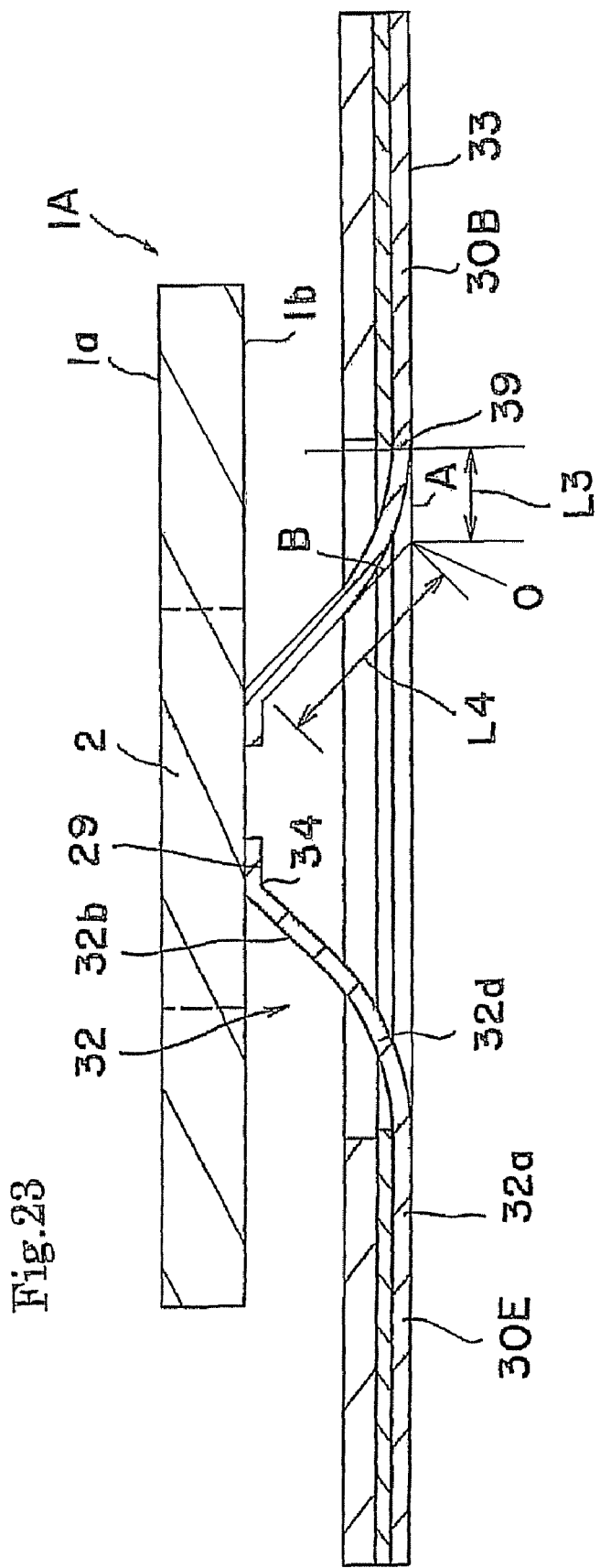
FIG. 23 is a cross sectional view showing a supporting structure according to a second aspect of the present invention.

For example, according to an example shown in FIGS. 22 and 23, the bonding wires 31 and 32 have end portions 29 to be bonded with the vibrator 1A, fixed portions 31a and 32a, leg portions 31b and 32b protruding from the fixed portions 31a, 32a, respectively, and curved portions 31d and 32d provided between the leg portions 31b, 32b and fixed portions 31a, 32a, respectively. The wire 31 of FIG. 22 further has a straight protrusion 31c. Further, if the vibration mode having a half (fd/2) of the resonance frequency of the driving vibration is present, the frequency can be made considerably distant from fd/2 to the lower side by providing the curved portions 31d and 32d between the leg portions 31b, 32b and fixed portions 31a, 32a, respectively. The temperature drift of the output and crystal impedance can be reduced over a wide temperature range.

According to the first and second embodiments of the present invention, preferably, the vibrator has a driving electrode for exciting driving vibration in the vibrator, and a detection electrode for detecting detection vibration excited in the vibrator, and the bonding wire is electrically connected to the driving or detection electrode.

Further, according to the first and second aspects of the present invention, preferably, the vibrator has a driving vibration piece equipped with a driving electrode, a detection vibration piece equipped with a detection electrode, and a base portion provided between the driving and detection vibration pieces. In this case, more preferably, the bent portion of the bonding wire is present outside of a region where the base portion is projected onto a supporting plate, and inside of a region where the vibrator is projected onto the supporting plate. That is, according to an example shown in FIG. 13, "H" represents a region inside of an outer periphery 2a of the base portion (region where the base portion is projected onto the supporting plate 40), and "T" represents a region where the vibrator 1A is projected on the supporting plate 40 (region inside of an outer periphery 1c of the vibrator). The bent portion 28 of the bonding wire 26 is positioned outside of the projected region "H" of the base portion and inside of the projected region "T" of the vibrator 1A, that is, inside of the ring-shaped region "G".

Further, according to first and second aspects of the present invention, preferably, the bonding wire starts to protrude at the position outside of the region where the base portion is projected on the supporting plate and inside of the region where the vibrator is protruded on the supporting plate. For example, as shown in an example of FIG. 13, the position 39 where the bonding wire 26 starts to protrude is outside of the region "H" where the base portion 2 is projected on the supporting plate 40 and inside of the region "T" where the vibrator 1A is projected on the supporting plate 40, that is, inside of the ring-shaped region "G".

According the first and second aspects of the present invention, more preferably, the vibrator has an elongate connecting portion connecting the base portion and driving vibration piece. In this case, most preferably, the vibrator is formed substantially along a plane. Moreover, in the vibration mode having a resonance frequency closest to fd/2 provided that fd is assigned to the resonance frequency of the driving vibration, the connecting portion vibrates in bending mode around the root of the connecting portion to the base portion towards the outside of the plane, and the driving vibration piece vibrates in bending mode around the root of the driving vibration piece to the connecting portion towards the outside of the plane. The connecting portion and driving vibration piece vibrate in bending mode in the same phase with respect to the plane. The example was described referring to FIGS. 10 to 12.

According to the first and second aspects of the present invention, preferably, the supporting member further has a substrate for supporting the supporting plate, and a cavity communicated with an opening of the supporting plate is formed in the substrate. It is thus possible to prevent the change of the vibration state due to the contact of the vibrator to the surface of the supporting plate when the vibrator vibrates over the supporting plate.

Figure 15:
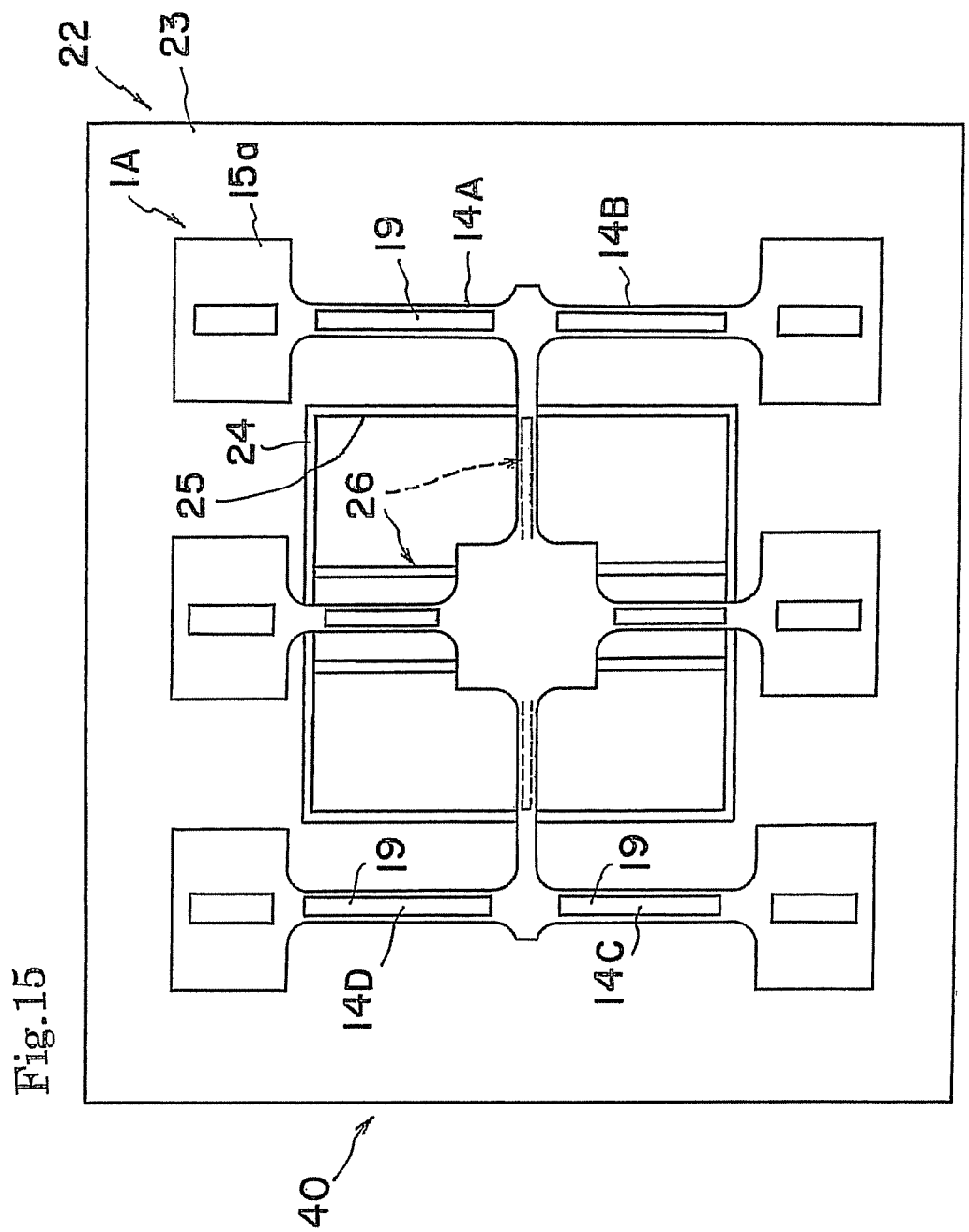
FIG. 15 is a plan view showing the supporting structure of FIG. 13.
Figure 16:
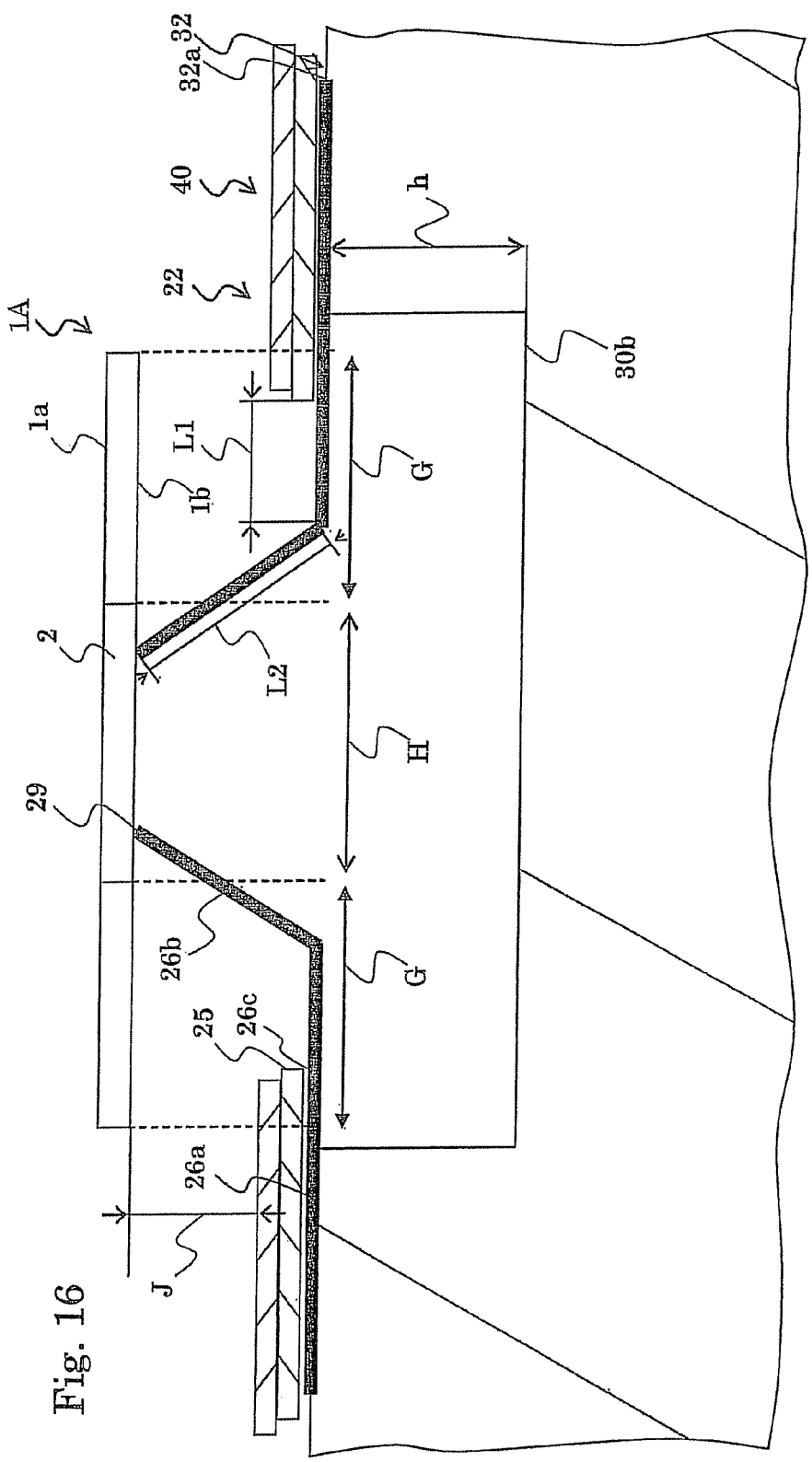
FIG. 16 is a cross sectional view showing the supporting structure of FIG. 14 provided on a substrate 32.

FIG. 15 is a plan view schematically showing a supporting structure according this embodiment. FIG. 16 is a cross sectional view schematically showing the supporting structure. The supporting member 22 of the present example is substantially same as the supporting member 22 shown in FIG. 13, and the same constituents are depicted by the same numerals and the explanation may be omitted. According to the present example, a substrate 32 separate from the supporting plate 40 is set direct under the supporting plate 40. The substrate 32 is, for example, a packaging substrate. A cavity 32b is formed on the side of a mounting face 32a of the substrate 32. The bonding wire 26 and vibrator 1 are mounted and supported on the cavity 32b. Further, according to the present example, according to FIG. 15, six bonding wires 26 are used. The depth "h" of the cavity 32b may preferably be a half or more of the height "J" of the vibrator with respect to the supporting plate 40, and more preferably equal to or higher than the height "J" of the vibrator with respect to the supporting plate 40.

According to the second aspect of the present invention, the shape of the leg portion is not particularly limited. For example, the leg portion may be straight, or curved or bent in a cross section shown in FIGS. 22 and 23.

Further, the radius of curvature of the curved portion 31d or 32d (radius of curvature in a cross section shown in FIGS. 22 and 23) may preferably be 0.2 mm or more and more preferably be 0.3 mm or more, on the viewpoint of reducing the temperature drift of the output. When the radius of curvature of the curved portion 31d or 32d becomes too large, however, the vibration state of the vibrator would be influenced. On the viewpoint, the radius of curvature may preferably be 1 mm or smaller and more preferably be 0.8 mm or smaller.

Further, according to a preferred embodiment of the second aspect of the present invention (refer to FIGS. 22 and 23), first tangential lines "A" abutting on faces of fixed portions 31a and 32a opposite to the vibrator 1A, respectively, second tangential lines "B" abutting on faces of leg portions 31b and 32b opposite to the vibrator 1A at the ends 34, respectively, and a crossing point "O" of the first and second tangential lines "A" and "B" is drawn. A distance "L3" of the crossing point "O" and the position 39 where the bonding wire starts to protrude from the supporting plate on the first tangential line "A" may preferably be 10 percent or more of a distance "L4" of the crossing point "O" and the end 34 on the leg portion on the second tangential line "B". It is thus possible to further reduce the temperature drift more effectively. On the viewpoint, L3/L4 may preferably be 30 percent or more and more preferably be 50 percent or more. On the contrary, when L3 is too large, the height of the vibrator 1A with respect to the supporting plate 40 tends to be easily changed so that the amplitude of unnecessary vibration might become large. On the viewpoint, L3/L4 may preferably be 400 percent or lower and more preferably be 300 percent or lower.

The material of the vibrator is not particularly limited, and may preferably be a piezoelectric single crystal. The material may more preferably be a piezoelectric single crystal selected from the group consisting of quartz, lithium niobate, lithium tantalate, lithium niobate-lithium tantalate solid solution, lithium borate and langasite.

The dimensions of the vibrator are not particularly limited. However, if the weight or dimensions of the vibrator is too large, too much weight may be applied on the bonding wire to possibly deform the bonding wire over a long period of time. The width of the vibrator may preferably be not larger than 10 mm and more preferably be not larger than 5 mm for preventing adverse effects of the deformation of the bonding wire on the vibration. On this viewpoint, the weight of the vibrator may preferably be not larger than 5 mg and more preferably be not larger than 1 mg. Further, the thickness of the vibrator may preferably be not larger than 0.3 mm and more preferably be not larger than 0.2 mm.

The material of a substrate is not particularly limited and may be an insulating material, used for a package, such a ceramics, glass or resin.

The bonding wire may be joined with the vibrator by means of a process not particularly limited, including ultrasonic bonding, spot welding, a conductive adhesive or soldering.

The bonding wire is electrically connected with a terminal of the vibrator. According to a preferred embodiment, the bonding wire is joined with a terminal of the vibrator. The bonding wire is, however, not necessarily directly joined with the terminal. For example, the tip end of the bonding wire may be joined with the vibrator at a region other than the terminal. In this case, the tip end of the bonding wire and the terminal may be electrically connected through a wiring on the vibrator or through an electric cable separate from the vibrator.

It is desirable to support the vibrator so that the vibrator does not directly contact with the substrate for preventing the adverse effects on the vibration of the vibrator. According to a preferred embodiment, the distance "J" of the vibrator and the supporting plate is not smaller than 0.1 mm and more preferably is not smaller than 0.2 mm.

The bonding wire is made of a conductive material not particularly limited, and may preferably be flexible or deformable. On this viewpoint, the material may be copper with gold plating, nickel with gold plating, nickel or aluminum.

The width and thickness of the bonding wire are not particularly limited, and may preferably be not smaller than 25 μm and 10 μm, respectively, and more preferably be not smaller than 50 μm and 20 μm, respectively, for stably supporting the vibrator for a long period of time. The width and thickness of the bonding wire may preferably be not larger than 200 μm and 80 μm, respectively, and more preferably be not larger than 100 μm and 40 μm, respectively, for miniaturizing the whole supporting structure.

A physical quantity measured according to the present invention is not particularly limited. When a driving vibration is excited in a vibrator and the vibration state of the vibrator is changed due to the effects of a specific physical quantity exerted on the vibrator, the physical quantity is included in the present invention as far as the physical quantity can be detected through a detection circuit. Such physical quantity may preferably be an acceleration, an angular acceleration or an angular rate applied on a vibrator. The measuring system of the present invention may preferably be an inertia censor.

EXAMPLES

Example A

The vibrator and the supporting structure shown in FIGS. 15 and 16 were produced. According to the present example, however, each of the constituent parts was changed as shown in each of FIGS. 17 to 21.

Specifically, the vibrator 1A shown in FIGS. 1 and 2 was used. A chromium film of 100 angstroms in thickness and a gold film of 1500 angstroms in thickness were formed in predetermined regions on a wafer made of a Z-plate of quartz with a thickness of 0.1 mm, by sputtering. Both main faces of the wafer were coated with resist films.

The wafer was then immersed in aqueous solution of iodine and potassium iodide to remove excessive gold in the gold film by etching, and was further immersed in aqueous solution of cerium-ammonium nitrate and perchloric acid to remove excessive chromium in the chromium film by etching. The wafer was etched by immersing the wafer in ammonium bifluoride at a temperature of 80° C. for 20 hours to form the external shape of the vibrator 1A. A gold film having a thickness of 2000 angstrom was formed as a film for electrode on the chromium film having a thickness of 100 angstrom using a metal mask. The vibrator 1A had a length of 3.8 mm, a width of 4.5 mm, a thickness of 0.1 mm and a weight of about 0.8 mg.

Figure 17:
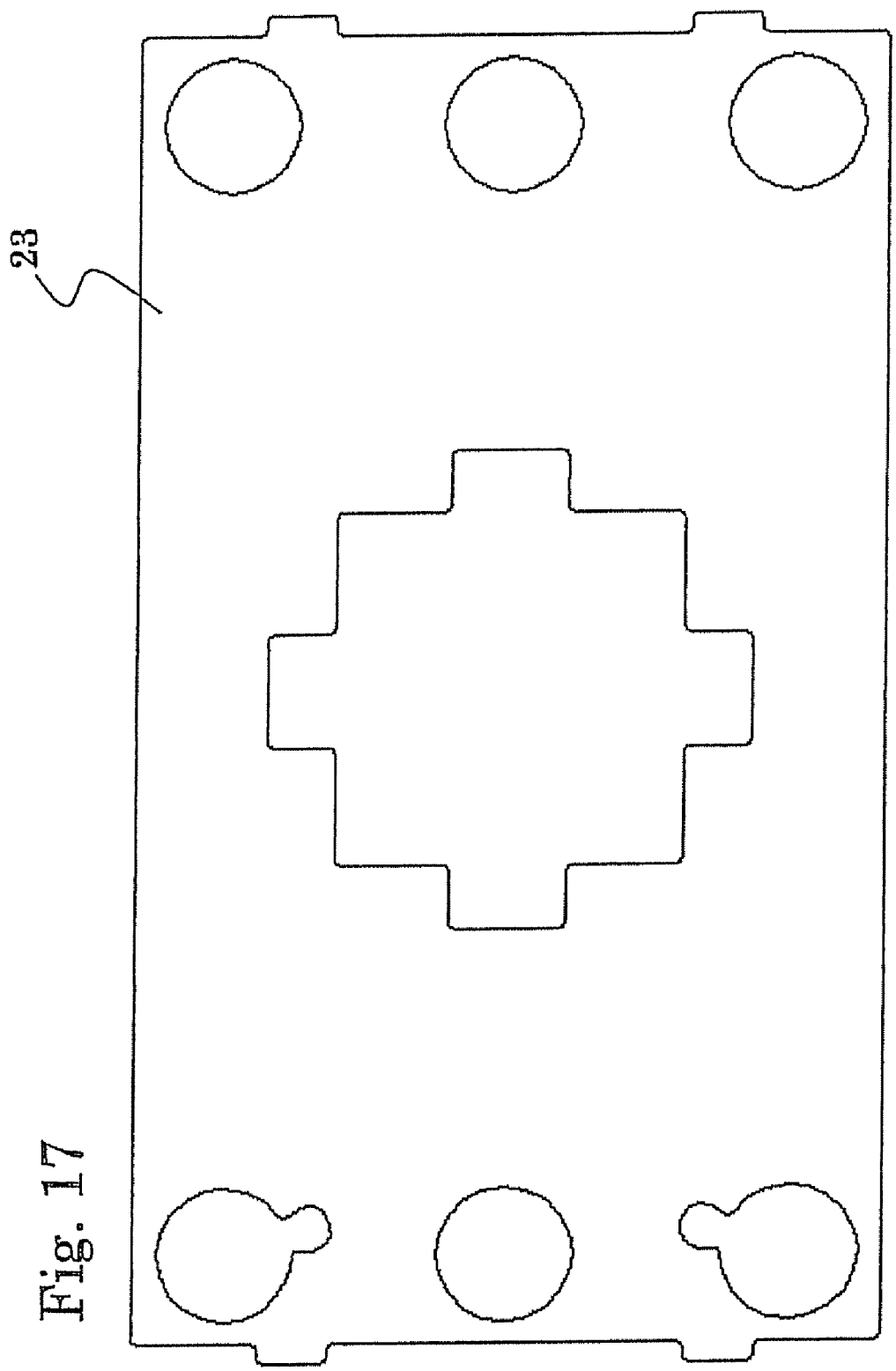
FIG. 17 is a plan view showing a plate-shaped body 23 used in an example.
Figure 18:
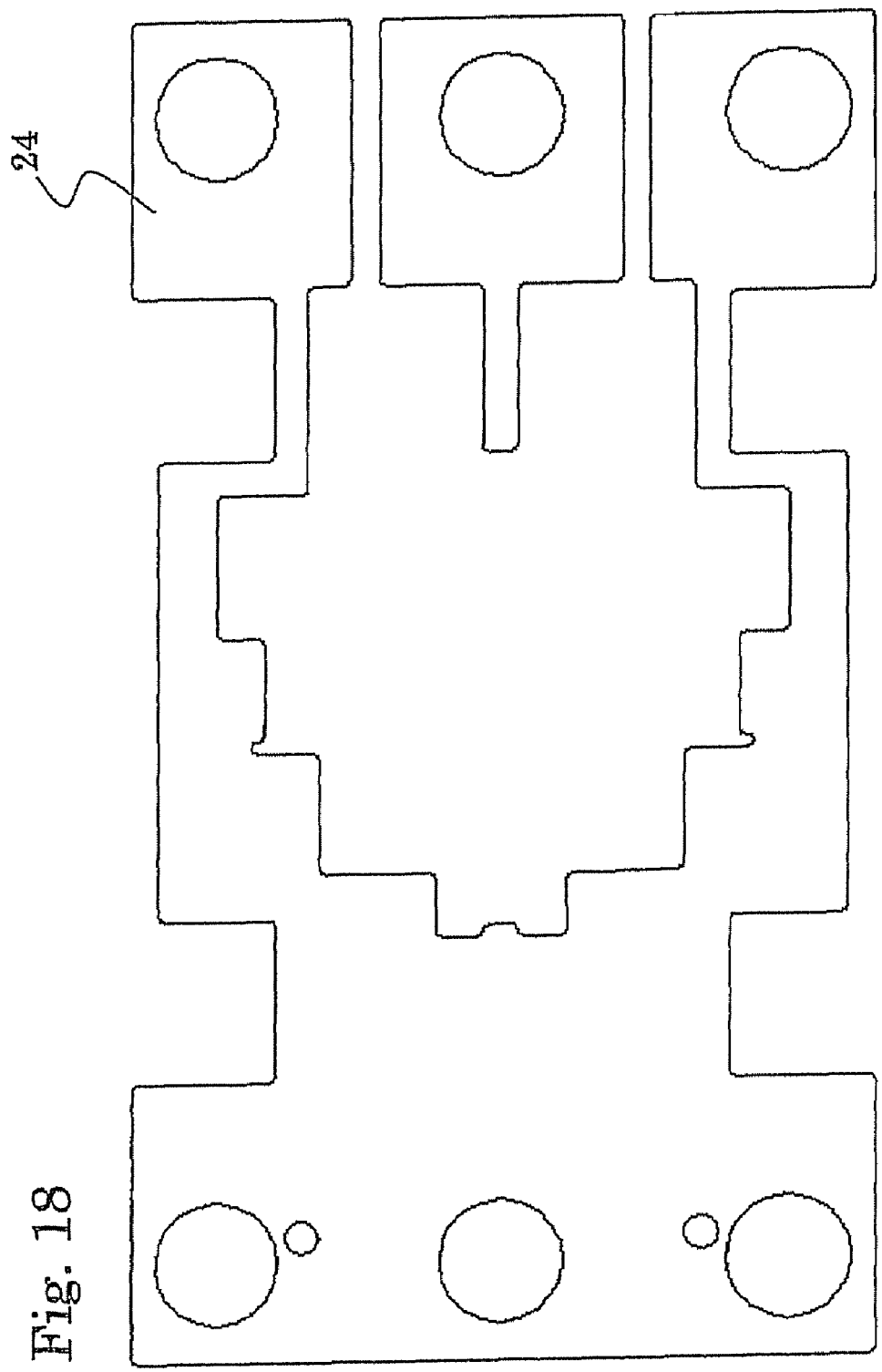
FIG. 18 is a plan view showing a plate-shaped body 24 used in an example.
Figure 19:
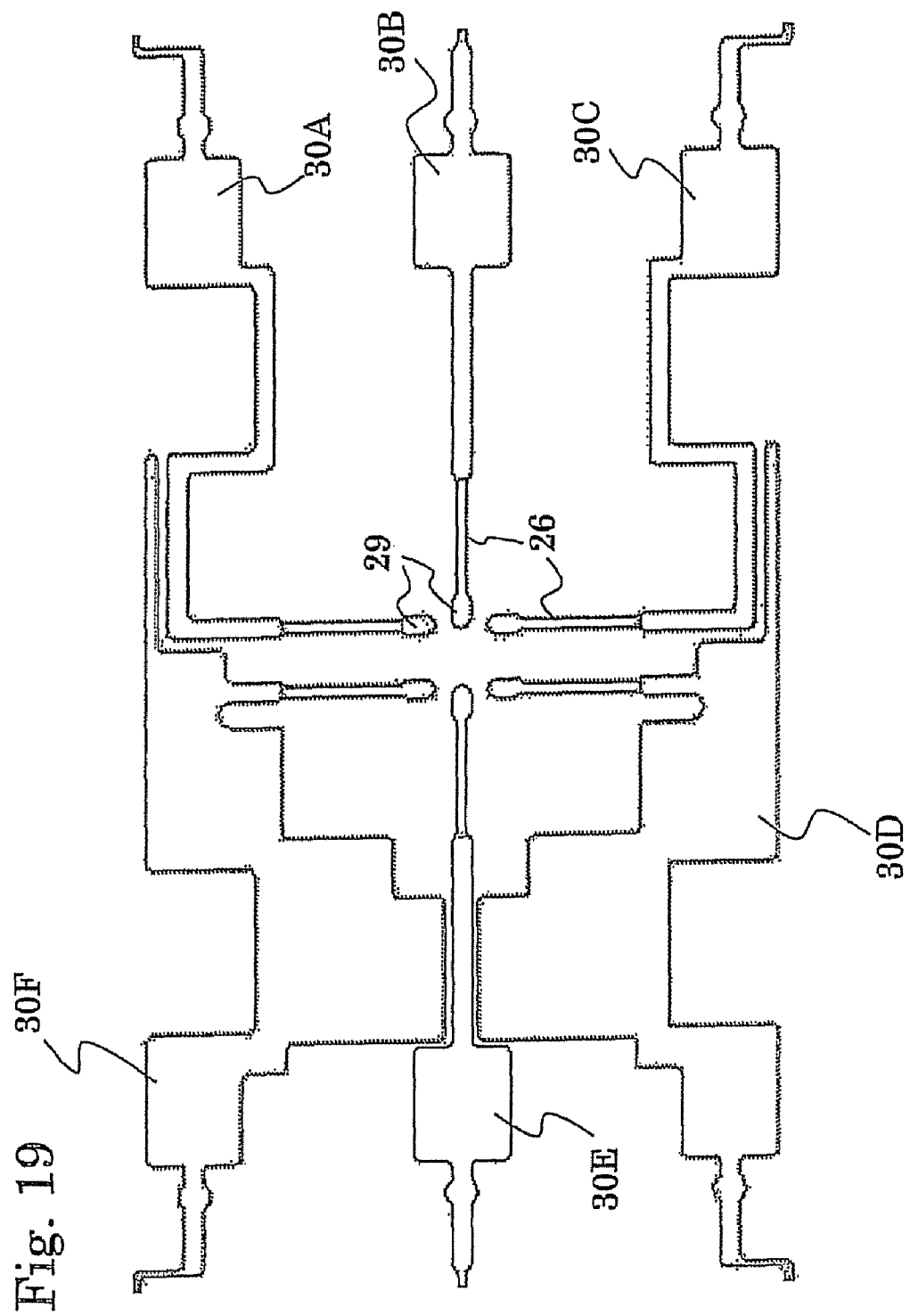
FIG. 19 is a diagram showing the planar shape of each bonding wire 29 and each of conductive terminal portions 30A to 30F.
Figure 20:
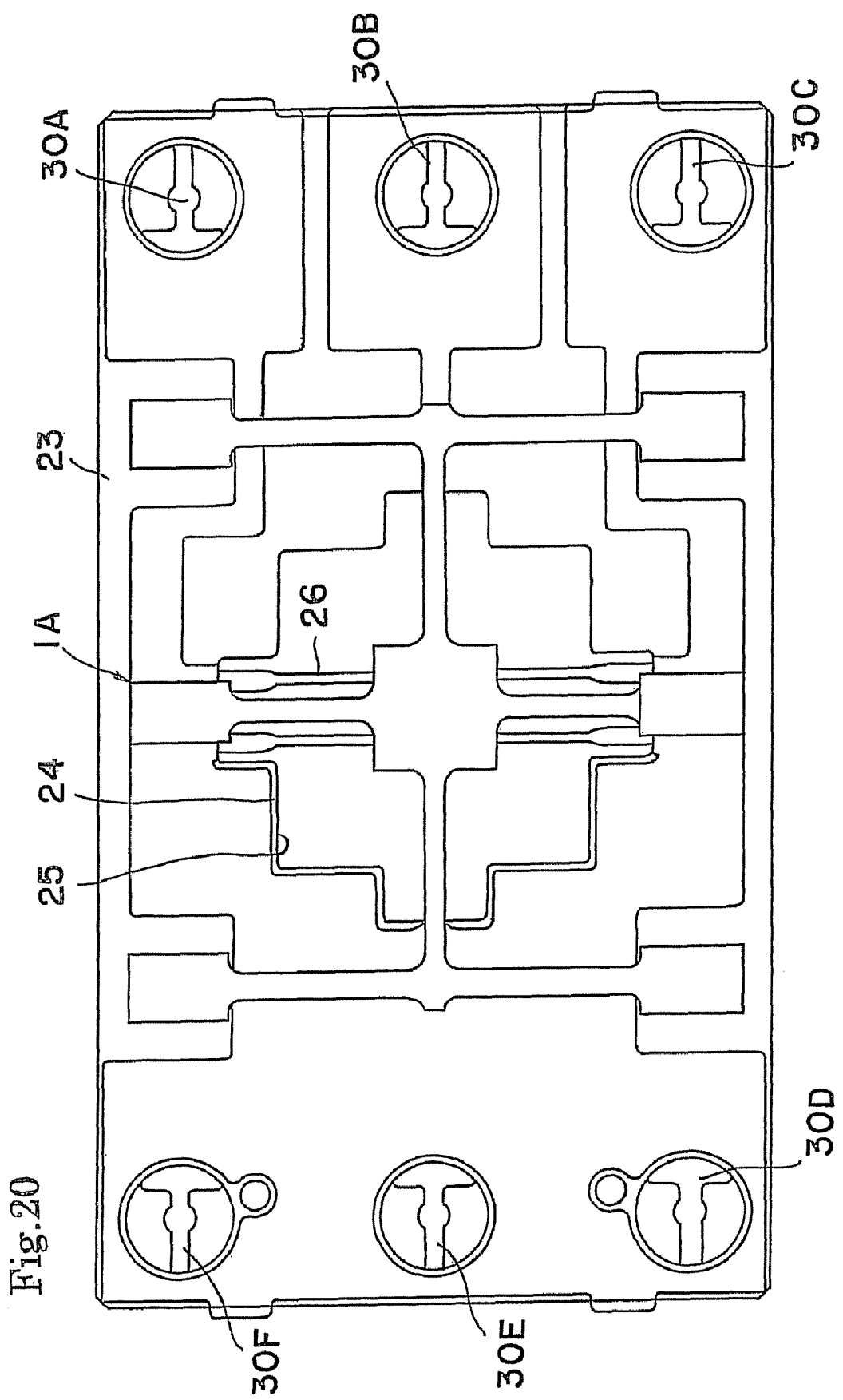
FIG. 20 is a plan view of a supporting structure according to an example.
Figure 21:
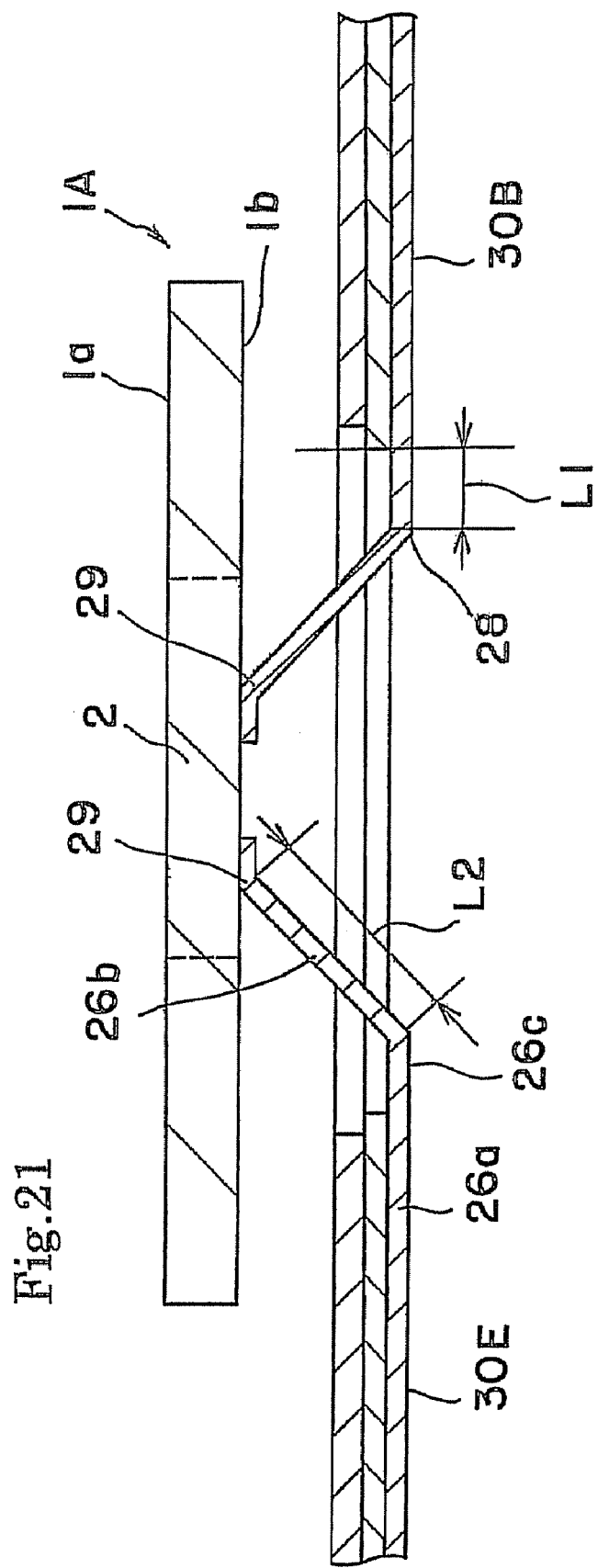
FIG. 21 is a cross sectional view showing a supporting structure according to an example.

The vibrator 1A was mounted in a package. The upper plate-shaped body 23 had a planar shape as shown in FIG. 17, which was made of stainless steel. The lower plate-shaped body 24 had a planar shape as shown in FIG. 18 and was made of polyamide. The substrate 32 was formed of alumina ceramics. The depth "h" of the cavity was made 0.1 mm. The height "J" of the vibrator 1A with respect to the surface of the supporting plate 40 was made 0.1 mm. Further, FIG. 19 shows the shapes of the bonding wires and conductive terminals 30A, 30B, 30C, 30D, 30E and 30F. FIG. 20 is a plan view showing an assembly of the plate shaped bodies 23, 24, vibrator 1A and bonding wires 26. Further, FIG. 21 is a cross sectional view showing a supporting structure according to the present example.

Further, the contact pads of the bonding wires were made of gold, and the bonding wire was produced by plating a copper film wire with gold. The copper film wire had a thickness of 0.018 mm and a width of 0.03 mm. The base portion 2 of the vibrator 1A was bonded with the bonding wire by means of ultrasonic bonding so that the vibrator was fixed to the supporting plate 40.

The thus obtained vibratory gyroscope was contained in a temperature bath and the ambient temperature was changed in a range of minus 40° C. to plus 85° C. L1/L2 was changed as shown in table 1 for each example. A self-oscillation circuit was used to excite the driving vibration for observing the presence of the resonance flattening phenomenon. Further, it was searched the vibration mode having a resonance frequency closest to fd/2 and the resonance frequency was measured. Each resonance frequency of each vibration mode was measured using an impedance analyzer. The results were shown in Table 1.

TABLE 1

| Ex. No. | L1/L2 (%) | Position Where Protrusion Start | Position Where Bending Start | Fd/2 (Hz) | Resonance Frequency of Vibration Mode Closest to fd/2 Z (Hz) | Resonance Flattening |
|---|---|---|---|---|---|---|
| 1 | 0 | In region "G" | In region "G" | 22235 | 22350 | Present 50-90° C. |
| 2 | 7 | In region "G" | In region "G" | 22728 | 22900 | Present 30-60° C. |
| 3 | 10 | In region "G" | In region "G" | 22710 | 23050 | Absent |
| 4 | 100 | In region "G" | In region "G" | 22740 | 25100 | Absent |

As can be seen from Table 2, the resonance flattening phenomenon can be prevented in a range of minus 40° C. to plus 85° C. by adjusting L1/L2 according to the present invention. It is further proved that it is preferred to provide the position where the bonding wire starts to protrude and bent portion in the region "G".

Experiment B

The vibrator 1A was produced according to the same procedure as the Experiment A. The vibrator was supported on the supporting system having a shape shown in FIG. 23 and mount in a package. The plate shaped bodies 23, 24 and substrate 32 were same as those described in the Experiment A. The height of the vibrator 1A with respect to the surface of the supporting plate was made 0.1 mm. The contact pad, material, dimensions and fixing method of the bonding wire were same as the Experiment A, except that L3 and L4 in FIG. 23 were changed as shown in Table 2. Further, the radius of curvature of the curved portion 32a in experiment number 5 was 0.08 mm, and the radius of curvature of the curved portion 32a in the experiment number 6 was 9.3 mm.

The thus obtained vibratory gyroscope was measured for each resonance frequency of each vibration mode using an impedance analyzer, according to the same procedure as the Experiment A. The results were shown in Table 2.

TABLE 2

| Ex. No. | L3/L4 (%) | Position Where Protrusion Start | Crossing Point of L1 and L2 | Fd/2 (Hz) | Resonance Frequency Of Vibration Mode Closest to fd/2 Z (Hz) | Resonance Flattening Phenomenon |
|---|---|---|---|---|---|---|
| 5 | 10 | In region "G" | In region "G" | 23317 | 23060 | Absent |
| 6 | 50 | In region "G" | In region "G" | 23552 | 22505 | Absent |

As described above, according to the present invention, in a physical quantity measuring system using a vibrator, it can be provided a supporting structure of a vibrator for reducing the zero-point temperature drift of detection signal.

What is claimed:

1. A gyroscope comprising a member for supporting a vibrator with a bonding wire, said member for supporting a vibrator comprising:
   a supporting plate with an opening formed therein to be positioned directly under a vibrator; and
   a bonding wire comprising an end portion to be bonded with said vibrator, a fixed portion fixed on said supporting plate and a bent portion,
   wherein a distance "L1" between said bent portion and a position where said bonding wire starts to protrude from said supporting plate is 10 percent or more of a distance "L2" between said bent portion and said end portion.

2. The gyroscope of claim 1, further comprising a substrate for supporting said supporting plate, wherein a cavity communicated with said opening is provided in said substrate.

3. The gyroscope of claim 1, wherein said fixed portion of said bonding wire is fixed onto a back face of said supporting plate.

4. The gyroscope of claim 1, wherein said vibrator comprises a driving electrode for exciting driving vibration in said vibrator and a detection electrode for detecting detection vibration excited in said vibrator, wherein said bonding wire is electrically connected with one of said driving electrode and said detection electrode.

5. The gyroscope of claim 4, wherein said vibrator comprises a driving vibration piece with said driving electrode provided thereon, a detection vibration piece with said detection electrode provided thereon and a base portion provided between said driving vibration piece and said detection vibration piece.

6. The gyroscope of claim 5, wherein said bent portion is present outside of a region where said base portion is projected on said supporting plate and inside of a region where said vibrator is projected on said supporting plate.

7. The gyroscope of claim 5, wherein said position where said bonding wire starts to protrude is present outside of a region where said base portion is projected on said supporting plate and inside of a region where said vibrator is projected on said supporting plate.

8. The gyroscope of claim 5, wherein said vibrator further comprises an elongate connecting portion connecting said base portion and said driving vibration piece.

9. The gyroscope of claim 8, wherein said vibrator is formed substantially along a plane, wherein said connecting portion vibrates in bending mode to the outside of said plane around a root of said connecting portion to said base portion, wherein said driving vibration piece vibrates in bending mode to the outside of said plane around a root of said driving vibration piece to said connecting portion, and wherein said vibration in bending mode of said connecting portion comprises a phase with respect to said plane that is the same as that of said vibration in bending mode of said driving vibration piece, in a vibration mode having a resonance frequency closest to fd/2 provided that fd is assigned to the resonance frequency of said driving vibration.

10. An accelerometer comprising a member for supporting a vibrator with a bonding wire, said member for supporting a vibrator comprising:
   a supporting plate with an opening formed therein to be positioned directly under a vibrator; and
   a bonding wire comprising an end portion to be bonded with said vibrator, a fixed portion fixed on said supporting plate and a bent portion,
   wherein a distance "L1" between said bent portion and a position where said bonding wire starts to protrude from said supporting plate is 10 percent or more of a distance "L2" between said bent portion and said end portion.

* * * * *

UNITED STATES PATENT AND TRADEMARK OFFICE
CERTIFICATE OF CORRECTION

PATENT NO. : 7,788,978 B2  Page 1 of 1
APPLICATION NO. : 12/259441
DATED : September 7, 2010
INVENTOR(S) : Seiji Ishikawa, Takayuki Kikuchi and Shigeki Hayashi It is certified that error appears in the above-identified patent and that said Letters Patent is hereby corrected as shown below:

Title Page,
Item (63) Related U.S. Application Data:
*please change* "Continuation of application No. 11/430,531, filed as application No. PCT/JP2004/016361 on Oct. 28, 2004, now Pat. No. 7,456,554"
to --Continuation of application No. 11/430,531, filed May 9, 2006, now Pat. No. 7,456,554, which is a Continuation of application No. PCT/JP2004/016361, filed Oct. 28, 2004--

Signed and Sealed this
Twenty-eighth Day of December, 2010

David J. Kappos
*Director of the United States Patent and Trademark Office*